US012795202B2

(12) United States Patent
Pearce et al.

(10) Patent No.: US 12,795,202 B2
(45) Date of Patent: Nov. 10, 2026

(54) METHODS AND SYSTEMS FOR RECOMMENDING CONTENT RESTRICTIONS

(71) Applicant: Adeia Guides Inc., San Jose, CA (US)

(72) Inventors: Andrew Pearce, Wokingham (GB); Charles Dawes, Tyne & Wear (GB); Della Preston, Berks (GB)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/062,554

(22) Filed: Feb. 25, 2025

(65) Prior Publication Data

US 2025/0310605 A1 Oct. 2, 2025

Related U.S. Application Data

(63) Continuation of application No. 18/626,813, filed on Apr. 4, 2024, now Pat. No. 12,267,555, which is a continuation of application No. 18/135,919, filed on Apr. 18, 2023, now Pat. No. 11,979,635, which is a continuation of application No. 17/874,659, filed on (Continued)

(51) Int. Cl.

| | |
|---|---|
| ***H04N 21/454*** | (2011.01) |
| ***G06F 16/955*** | (2019.01) |
| ***H04N 21/45*** | (2011.01) |
| ***H04N 21/4545*** | (2011.01) |
| ***H04N 21/466*** | (2011.01) |
| ***H04W 12/64*** | (2021.01) |

(52) U.S. Cl.

CPC ....... *H04N 21/4542* (2013.01); *G06F 16/955* (2019.01); *H04N 21/4524* (2013.01); *H04N 21/4545* (2013.01); *H04N 21/4661* (2013.01); *H04N 21/4662* (2013.01); *H04W 12/64* (2021.01)

(58) Field of Classification Search

CPC ........... H04N 21/4542; H04N 21/4524; H04N 21/4545; H04N 21/4661; H04N 21/4662; H04N 21/4622; H04N 21/4532; H04N 21/4755; H04N 21/4788; H04N 21/8405; G06F 16/955; H04W 12/64; H04W 4/21; H04W 4/023; H04W 12/00; H04L 63/102

See application file for complete search history.

(56) References Cited

U.S. PATENT DOCUMENTS

2014/0096180 A1* 4/2014 Negi ........................ G06F 21/00
2016/0248766 A1* 8/2016 Tembey .............. H04L 63/0861

OTHER PUBLICATIONS

"Full AutoModerator documentation", reddit.com, Retrieved from URL: https://old.reddit.com/r/reddit.com/wiki/automoderator/full-documentation?v=8a21ef46-2110-11e6-ae14-0efa0b9df8a5, May 23, 2016, 4 Pages.

(Continued)

*Primary Examiner* — Anthony Bantamoi

(74) *Attorney, Agent, or Firm* — HG LAW LLP

(57) ABSTRACT

Systems and methods are described herein for recommending content restrictions to a user based on chatter in a social network of the user. The system analyzes chatter in the social network to identify a correlation between what is posted by users and the content that the users are posting about. The system stores a mapping between chatter and expected attributes of the content referenced by the chatter. The system will determine whether to block the content when an expected attribute is associated with a content restriction.

20 Claims, 8 Drawing Sheets

Related U.S. Application Data

Jul. 27, 2022, now Pat. No. 11,665,399, which is a continuation of application No. 17/027,760, filed on Sep. 22, 2020, now Pat. No. 11,438,657, which is a continuation of application No. 16/066,121, filed as application No. PCT/US2016/060609 on Nov. 4, 2016, now Pat. No. 10,834,463.

(56) References Cited

OTHER PUBLICATIONS

"Library of Common Rules", Retrieved from URL: https://old.reddit.com/r/AutoModerator/wiki/library?v=4ee0f8a4-b88a-11e4-a308-22000b2687a4, Aug. 8, 2015, 5 Pages.
"Writing basic AutoModerator rules", reddit.com, Retrieved from URL: https://old.reddit.com/r/reddit. com/wiki/ automoderator/writing-basic-rules?v=5c09b4ba-d7c2-11e4-ac56-22000b6a03aa, Mar. 31, 2015, 2 Pages.

* cited by examiner

200

202 204 206 216 212 214 210 220 208 218

| Entry # | User | Previous Indication | Media Characteristic | Full Indication Text |
|---|---|---|---|---|
| 1 | Kip Smith | Closing my eyes | Violence | Closing my eyes because I can't bear to watch the movie "300" #Violent |
| 2 | Kip Smith | Closing my eyes | Violence | Closing my eyes! I can't believe the amout of blood in "Saw VI" |
| 3 | Alex Astley | Ooh la la | Sexual Content | Ooh la la, check out Halle Berry in "Swordfish" #Provocative |
| 4 | Steve Synergy | Ooh la la | Sexual Content | The last scene in @GameOfThrones tonight made me go 'Ooh la la' |

FIG. 2

METHODS AND SYSTEMS FOR RECOMMENDING CONTENT RESTRICTIONS

CROSS-REFERENCE TO RELATED APPLICATIONS

This application is a continuation application of U.S. patent application Ser. No. 18/626,813, filed Apr. 4, 2024, which is a continuation application of U.S. patent application Ser. No. 18/135,919 (now U.S. Pat. No. 11,979,635), filed Apr. 18, 2023, which is a continuation application of U.S. patent application Ser. No. 17/874,659 (now U.S. Pat. No. 11,665,399), filed Jul. 27, 2022, which is a continuation of U.S. patent application Ser. No. 17/027,760 (now U.S. Pat. No. 11,438,657), filed Sep. 22, 2020, which is a continuation of U.S. patent application Ser. No. 16/066,121 (now U.S. Pat. No. 10,834,463), filed Jun. 26, 2018, which is a national stage application under 35 U.S.C. § 371 of International Application PCT/US2016/060609, filed Nov. 4, 2016, all of which are hereby incorporated by reference herein in their entireties.

BACKGROUND

In conventional systems, a user can restrict access to content that may be inappropriate to a user or a group of users based on content ratings associated with media. For example, a parent may restrict access to media by a child when a content rating is above a specified threshold. However, oftentimes the content ratings fail to accurately capture the full scope of content in the media. Therefore, the child may be unintentionally restricted from watching media that is actually appropriate for the child (e.g., when a content rating is higher than it should be for the child) or, conversely, the child may be unintentionally granted access to media that is inappropriate for the child (e.g., when a content rating is lower than it should be for the child). For example, a child may be mature enough to view media having violence but not mature enough to view media having sexual content. Content ratings alone may not accurately convey enough information to determine whether media is appropriate for the child. For example, a rating of R or PG-13 may be given to a movie having either violence and/or sexual content based on the degree to which the content is present in media. A block on movies R-rated and up may unintentionally restrict the child from viewing an R-rated movie having only violence (e.g., a movie with content that the child is mature enough to view). Additionally, a block on movies R-rated and up may unintentionally allow the child to view a PG-13 rated movie (e.g., a movie with a content rating lower than R) having sexual content (e.g., a movie with content that the child is not mature enough to view).

Even when all of the content in the media is known, it may be difficult to know, a priori, whether a program is appropriate for a user. For example, a parent may generally know what content occurs during a media but may not know how people react to the content itself, and may, therefore, have trouble inferring whether his or her child is mature enough to view the content. Therefore, the parent may inadvertently apply an overly restrictive content block or may apply a content block that would expose the child to inappropriate content due to a lack of understanding of the content itself.

SUMMARY

Systems and methods are described herein for providing a media guidance application that recommends content restrictions based on indications from other users. For example, the system may identify to a first user a restriction to apply to media with respect to a second user. For example, the system may suggest to a parent a content restriction to apply with respect to his or her child. The system may identify the restriction based on a social media post from a third user in the first user's social media network. For example, the system may monitor social media posts of other users in the guardian's social network. For example, the system may monitor social media posts of friends of the child, other guardians, and other suitable users. The system may identify content restrictions based on monitoring the social network of the first user. For example, the system may identify a third user, such as a friend of the guardian's child, and may determine that the third user frequently posts the words "Ooh la la" when viewing media having sexually explicit content. The system may notify the guardian of instances when the third user posts the words "Ooh la la" and may recommend blocking media associated with the instance. For example, the system may predict that when the user posts "Ooh la la" that they are viewing media having sexually explicit content, based on a history of previous social media posts showing that trend. In response to determining that a post matches previous posts by the third user, the system identifies media associated with the post and may recommend a content restriction to the first user. For example, in response to determining that a third user, such as a friend of the parent, posted "Ooh la la," the system may identify media that is associated with the post and may prompt the parent to apply a block on that media for his or her child.

In some aspects, the media guidance application may analyze a plurality of previous indications from a social network of a first user to identify mappings between previous indications and media characteristics. Each respective previous indication is associated with a respective media asset of a plurality of media assets. Each respective mapping is identified based on determining that the respective previous indication corresponds to a media characteristic of the respective media asset. For example, the media guidance application may analyze the plurality of previous indications, such as social media posts, in a social network of a first user, such as a parent or guardian, to identify a correlation between previous indications (e.g., previous Tweets from a user) and media characteristics (e.g., sexual content, violence, foul language, or suggestive dialog). The system may identify the number of times a certain indication appears with respect to a media characteristic. For example, the system may identify how frequently users post the words "Ooh la la" when describing media having sexual content. In response to determining that users frequently post the words "Ooh la la" when describing media having sexual content, the media guidance application may associate the previous indication (e.g., the term "Ooh la la") with the media characteristic (e.g., sexual content). For example, the media guidance application may associate the previous indication with the media characteristic by inserting a new entry into a database including the previous indication "Ooh la la" and the media characteristic sexual content.

In some embodiments, the media guidance application may associate a portion of a previous indication with a media characteristic. For example, the media guidance application may receive a first previous indication from a social network of a first user, such as "Ooh la la, check out Halle Berry in "Swordfish" #Provocative" and may associate the portion of the indication "Ooh la la" with the media characteristic "sexual content," because the system may determine that the words “Ooh la la” appear more frequently than the other words of the indication “check out Halle Berry in “Swordfish” #Provocative” when users in the social network describe media having sexually explicit content.

In some embodiments, the media guidance application may identify a portion of the indication to map to a media characteristic based on the frequency with which a portion of the indication appears with respect to other previous indications. For example, the media guidance application may compute a first frequency with which a first portion of the previous indication appears with respect to the media characteristic and a second frequency with which a second portion of the previous indication appears with respect to the media characteristic. For example, the media guidance application may determine how frequently a first portion, such as “Ooh la la” appears with respect to indications associated with sexual content, and may determine how frequently a second portion, such as “Halle Berry,” appears with respect to indications associated with sexual content.

In some embodiments, the media guidance application may determine whether the first frequency is greater than the second frequency. In response to determining that the first frequency is greater than the second frequency, the media guidance application may map the first portion (e.g., “Ooh la la”) to the media characteristic (e.g., sexual content). In response to determining that the first frequency is not greater than the second frequency, the media guidance application may map the second portion (e.g., “Halle Berry”) to the media characteristic (e.g., sexual content).

In some embodiments, the media guidance application may map previous indications to media characteristics based on determining that a first portion of a first previous indication matches a second portion of a second previous indication. For example, the media guidance application may receive a first and a second indication, such as a first social media post and a second social media post, from a social network of a first user. In an example, the media guidance application may receive a first previous indication such as “Ooh la la, check out Halle Berry in ‘Swordfish’ #Provocative” and a second previous indication such as “The last scene in @GameOfThrones tonight made me go ‘Ooh la la’” from a plurality of previous indications. The media guidance application may determine that the first media asset associated with the first indication (e.g., “Swordfish”) and the second media asset associated with the second indication (e.g., “Game of Thrones”) are both associated with sexual content. Accordingly, the media guidance application may map “Ooh la la” to the media characteristic sexual content (e.g., because the media guidance application identifies a similar reaction in both indications, “Ooh la la”, for media having sexual content).

In some embodiments, the media guidance may select the first indication and the second indication associated with a third user of the plurality of users. For example, the media guidance application may select indications from a single user to compare the two indications to determine how the third user reacts to different types of media. The media guidance application may select the third user such that the third user is similar to a second user to which the content blocks will apply. For example, the media guidance application may select the third user to be similar to the second user to predict how the second user will react to media. If the media guidance application determines that the reaction is inappropriate, the media guidance application may block access to media where the third user reacts similarly.

In some embodiments, the media guidance application may determine whether a first portion of the first indication matches a second portion of the second previous indication. For example, the media guidance application may compare the first indication to the second indication to determine whether the two indications have matching portions (e.g., a hashtag or emoticon in both the first and the second portion).

In some embodiments, the media guidance application may determine that the first and the second indication comprise words. For example, the media guidance application may determine that the first and second indications are text messages sent to a mobile device of the user. The media guidance application may determine whether words associated with the first previous indication match words associated with the second previous indication. For example, the media guidance application may compare words in the first and the second indication (e.g., a first and a second text message) to determine whether any words match both indications. For example, the media guidance application may determine that the first portion matches the second portion when words associated with the first previous indication match words associated with the second previous indication.

In some embodiments, in response to determining that the first portion matches the second portion, the media guidance application may identify a second media asset associated with the first previous indication and a third media asset associated with the second previous indication. The second media asset may be associated with a first plurality of media characteristics and the third media asset may be associated with a second plurality of media characteristics. For example, the media guidance application may retrieve from a database metadata associated with the second media asset and may determine that a portion of the indication matches the metadata. For example, the media guidance application may compare words of the first previous indication to a database of media assets to determine that the words ‘Swordfish’ and ‘Halle Berry’ match a database entry for the 2001 movie “Swordfish” starring Halle Berry. When a portion of the first previous indication matches a portion of the metadata, the media guidance application may determine that the indication is associated with the second media asset. The media guidance application may retrieve, from the same or a different database, media characteristics for the second media asset (e.g., “Swordfish”). For example, the media guidance application may retrieve data indicating a genre for the movie, actors and actresses in the movie, or characteristics of scenes such as sexual content, violence, and vulgar language. The same information may be matched to the indication in identifying the media asset associated with the indication.

In some embodiments, the media guidance application may determine that the media characteristic matches a respective media characteristic in both the first and the second plurality of media characteristics. For example, the media guidance application may compare the first plurality of media characteristics to the second plurality of media characteristics to identify a media characteristic associated with both the first and the second media asset. For example, the media guidance application may compare each media characteristic in the first plurality of media characteristics to each media characteristic in the second plurality of media characteristics to identify a media characteristic that is in both pluralities.

In some embodiments, in response to determining that the media characteristic matches a respective media characteristic in both the first and the second plurality of media characteristics, the media guidance application may map the first previous indication and the second previous indication to the media characteristic. For example, the media guidance application may add to a database a new entry comprising the first previous indication in a first database field and the media characteristic in a second database field. The media guidance application may map the first previous indication and the second previous indication to the media characteristic because both the first and the second previous indications may be associated with the media characteristic (e.g., because both indications are associated with media having the media characteristic). For example, the media guidance application may determine that there is a correlation between an indication and a media characteristic when a first and a second previous indication both match and correspond to different media having a same media characteristic.

The media guidance application may receive an indication from the social network of the first user, wherein the indication is associated with a first media asset. For example, the media guidance application may retrieve a current status update from a Facebook news feed of the user. The media guidance application may determine that the indication is associated with a first media asset (e.g., based on detecting a tag for the first media asset in a status update). For example, the media guidance application may retrieve a current status update "Howard Stern Show tonight, ooh la la!"

The media guidance application may compare the indication to mappings between previous indications and media characteristics to identify a previous indication, of the plurality of previous indications, matching the indication. For example, the media guidance application may compare words in the current status update to words in the previous indications (e.g., previous status updates) to identify a previous status update that is similar to the current status update. For example, the media guidance application may determine that the current status update "Howard Stern Show tonight, ooh la la" is similar to the previous indication "Ooh la la, check out Halle Berry in 'Swordfish' #Provocative" because both indications have the words "Ooh la la".

The media guidance application may identify a media characteristic associated with the previous indication. For example, the media guidance application may identify, based on the mapping, a media characteristic associated with the previous indication. For example, the media guidance application may identify the media characteristic sexual content based on the mapping between indications comprising "ooh la la" and the media characteristic "sexual content" as described above.

The media guidance application may determine, based on a profile of the second user, that the media characteristic is associated with a content restriction for the second user. For example, the media guidance application may retrieve a profile for the second user comprising a listing of media content restrictions. The media guidance application may compare the media characteristic to the list of media content restrictions to determine whether the media characteristic is on the list.

The media guidance application may block access to the first media asset by the second user in response to determining that the media characteristic is associated with a content restriction for the second user. For example, the media guidance application may block access to the first media asset when the media guidance application determines that the first media asset likely contains a type of content that is blocked for the user. For example, the media guidance application may determine, based on comparing the indication to the mapping of previous indications, that "The Howard Stern Show" likely has sexual content based on a determination that the user posted the words "Ooh la la" for "The Howard Stern Show" and for media identified, by the media guidance application, to have sexual content, such as the movie "Swordfish".

In some embodiments, the media guidance application may block access to the second media asset associated with the previous indication, by the second user. For example, the media guidance application may determine that media assets associated with an indication comprising "Ooh la la" should be blocked with respect to the second user because the indication "Ooh la la" indicates a reaction that is inappropriate for the second user.

In some embodiments, the media guidance application may update mappings between previous indications media characteristics by mapping the indication to the media characteristic. For example, the media guidance application may add an entry to a database storing the mappings, the entry having a first field for the indication and a second field for the media characteristic. The media guidance application may update the database based on the determination that the indication is likely associated with the media characteristic.

In some embodiments, the media guidance application may block and unblock access to the first media asset based on a location of the second user. For example, the media guidance application may identify, based on a profile of the second user, user equipment associated with the second user. For example, the media guidance application may retrieve data identifying a mobile phone of the second user, from a profile of the second user. The media guidance application may identify the location of the user equipment, for example, the media guidance application may retrieve a GPS signal from the user equipment to identify the location of the user equipment. The media guidance application may compute a distance between the first location and a second location associated with a parental control setting for the second user.

In some embodiments, the parental control setting may be associated with a location of second user equipment associated with the first user. For example, the media guidance application may identify a first location of a cell phone associated with a child and a second location of a cell phone associated with a guardian. The media guidance application may unblock access to the first media asset by the second user when a computed distance between the first and second location are within the threshold maximum distance. When the computed distance is greater than a threshold maximum distance the media guidance application may block access to the first media asset.

Conventional content restriction systems are configured to block content based on content ratings pre-assigned to media. However, statically assigned content ratings may not capture a full scope of content in the media. Furthermore, the content ratings may not accurately capture how a user will react to viewing the media (e.g., if the user is mature enough to view the media and react appropriately). The described systems and methods address shortcomings in conventional content restriction systems by analyzing previous indications for media in a social network and identifying characteristics of the media that might not be apparent from a content rating. The system may recommend a content restriction if the identified characteristic is one that should be restricted for a second user. By analyzing the interactions in the social network of the user and providing a content restriction recommendation based on an inferred media characteristic, the systems and methods described provide a smarter and more comprehensive approach to identifying and blocking content that will be inappropriate for another user.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of a database storing a mapping between indications and media characteristics in accordance with some embodiments of the disclosure;

DETAILED DESCRIPTION

Figure 1:
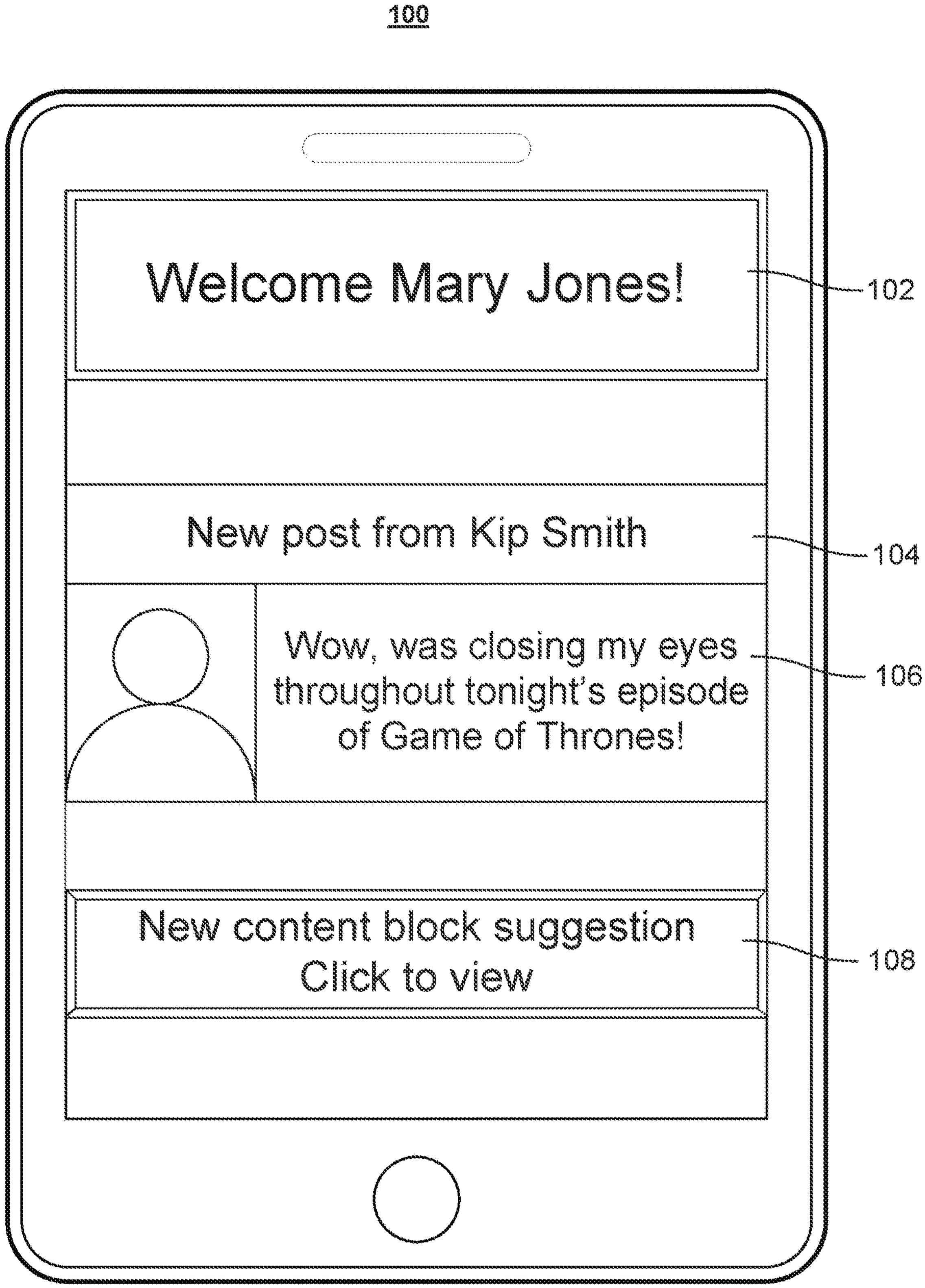
FIG. 1 shows an illustrative example of a user interface notifying the user of a user of a content restriction suggestion in accordance with some embodiments of the disclosure.

Methods and systems are described herein for addressing the shortcomings of conventional content restriction systems by analyzing social indications for media to determine whether media should be restricted. The systems and methods described herein may be implemented via an interactive media guidance application that suggests content restrictions based on indications detected in a social network of a user. In particular, the media guidance application may analyze previous indications in a social network of a user to identify a correlation between how users in the social network react to media and characteristics of the media to which the users are reacting. For example, the media guidance application may analyze a Facebook feed (e.g., a social network) of a parent and may determine that a user in the parent's social network (e.g., a friend of the parent's child) always posts the words "OMG crazy" when viewing media depicting drug use. Accordingly, the media guidance application may determine that there is a correlation between the words "OMG crazy" and media depicting drug use. Using the identified correlation, the media guidance application may suggest content restrictions to the user. For example, the media guidance application may retrieve a current indication from the social network (e.g., Facebook feed) of the parent (e.g., "OMG crazy, Frankie let me down on 'The Real World' this week"). The media guidance application may determine that because the indication comprises the term "OMG crazy" the media associated with the indication (e.g., "The Real World") will likely depict drug use (e.g., because the media guidance application determines that there is a correlation between the term "OMG crazy" and media depicting drug use) even when, for example, metadata associated with "The Real World" may not indicate that drug use is depicted. The media guidance application may suggest a content restriction for the media (e.g., "The Real World") if a profile of the second user determines that there should be a content restriction for media depicting drug use. For example, the media guidance application may suggest to the parent, a content block on "The Real World" with respect to his or her child because the media guidance application determines that the "The Real World" depicts drug use and that depictions of drug use are inappropriate for the child. Therefore, the media guidance application may apply a content restriction based on an indication in a social media network of a user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, a tablet, or any other television equipment, computing equipment, or wireless device, and/or combination of the same. In some embodiments, the user equipment device may have a front facing screen and a rear facing screen, multiple front screens, or multiple angled or curved screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some embodiments, control circuitry 604, discussed further in relation to FIG. 6 below, executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays discussed in relation to FIG. 1, FIG. 3, FIG. 4 and FIG. 5. In some implementations, any action performed by control circuitry 604 may be based on instructions received from the media guidance application.

In some embodiments, user equipment, such as user equipment 100 (FIG. 1) and 200 (FIG. 2), user television equipment 702 (FIG. 7), user computer equipment 704 (FIG. 7), and wireless user communications device 706 (FIG. 7) may comprise control circuitry (e.g., control circuitry 604) that executes a media guidance application for suggesting content restrictions to a user based on indications in a user's social network.

FIG. 1 shows an illustrative embodiment of a media guidance display notifying the user of a content restriction suggestion in accordance with some embodiments of the disclosure. User equipment 100 is depicted having welcome notification 102, new indication notification 104, indication 106, and content restriction suggestion 108. In this illustrative example, in addition to suggesting a content restriction, the media guidance application generates for display an interface welcoming a first user, Mary Jones, (e.g., welcome notification 102). The media guidance application may detect a new indication in the social network of the first user and, in response to detecting the new indication, the media guidance application may generate for display new indication notification 104 informing the first user that another user, Kip Smith, sent a new indication.

As referred herein, the term "in response to" refers to initiated as a result of. For example, a first action being performed in response to a second action may include interstitial steps between the first action and the second action.

As referred herein, the term "directly in response to" refers to caused by. For example, a first action being performed directly in response to a second action may not include interstitial steps between the first action and the second action.

As referred herein, the term "social network" refers to any system which one user can convey information to another user. For example, a social network may be a computer network used to transmit electronic messages between a first user and a second user. For example, a social network may be a computer network used to transmit email, chat, text, voice, and/or video messages. In some embodiments, a social network may be associated with an individual user and may include rules on how that individual user interacts with other users in the social network. For example, a social network associated with a first user may include a rule that allows for a first user to communicate with a second user, but may not allow for the first user to communicate with a third user. In another example, a social network associated with a first user may include a rule that will promote communications from a fourth user and ignore communications from a fifth user. For example, the first user may follow or be friends with the fourth user, accordingly, communications from the fourth user may be generated for display to first user.

As referred herein, the term "indication" refers to any mode which one user conveys information to another user using the social network. For example, a first user may transmit or broadcast an indication to a second user, or a plurality of other users, to indicate or convey any information from the first user to the second or plurality of other users. For example, an indication may be any sort of communication medium between a first and a second user. For example, an indication may be a text message, email, chat message, blog post, social media post, an audio clip, and/or a video clip intended for the first user to convey information to a second user. In another example, an indication may be a social media post from a first user indicating a dislike for a particular media asset.

In the illustrative example of FIG. 1, the media guidance application may generate for display contents of the indication detected by the media guidance application (e.g., indication 106). The media guidance application may compare the new indication to a mapping of previous indications to determine whether indication 106 matches a previous indication from the mapping of previous indications. If indication 106 matches a previous indication, the media guidance application may predict that the media characteristic associated with the previous indication should also be associated with indication 106. The media guidance application may determine whether there is a restriction on the media characteristic based on a profile of a second user (e.g., a child of the first user). If the media guidance application determines that there is a restriction on the media characteristic. The media guidance application may identify a media asset (e.g., Game of Thrones) associated with indication 106 and may generate for display and may generate for display a notification that the media guidance application has identified a new content block suggestion (e.g., content restriction suggestion 108).

FIG. 2 depicts an illustrative example of a database storing a mapping between indications and media characteristics in accordance with some embodiments of the disclosure. Table 200 is depicted having 4 entries, first entry 210, the first entry in the exemplary table, is depicted associated with first entry user 202, “Kip Smith”, first previous indication portion 204, “Closing my eyes”, first media characteristic 206, “Violence”, and first previous indication 208 “Closing my eyes because I can’t bear to watch the movie ‘300’ #Violent”. Additionally, second entry, 220 is depicted with associated with second entry user 212, “Kip Smith”, second previous indication portion 214, “Closing my eyes”, second media characteristic 216, “Violence”, and second previous indication 218 “Closing my eyes! I can’t believe the amount of blood in ‘Saw VI’”. As depicted in table 200, database entries, such as first entry 210 and second entry 220 may have some database fields comprising the same information. For example, the media guidance application may determine that the first and the second user for first previous indication 208 and second previous indication 218 are the same user, Kip Smith. Accordingly, the media guidance application may store data identifying the user Kip Smith in a database field corresponding to a user that transmitted the indication. An exemplary process for populating the exemplary database in FIG. 2 is described below in detail in relation to FIG. 8, FIG. 9, and FIG. 10. A person of ordinary skill in the art would recognize that this is just an exemplary database having exemplary database fields and data. One could add, remove, and/or modify any of the database fields or entries depicted in FIG. 2 without departing from the scope of the disclosure.

Figure 3:
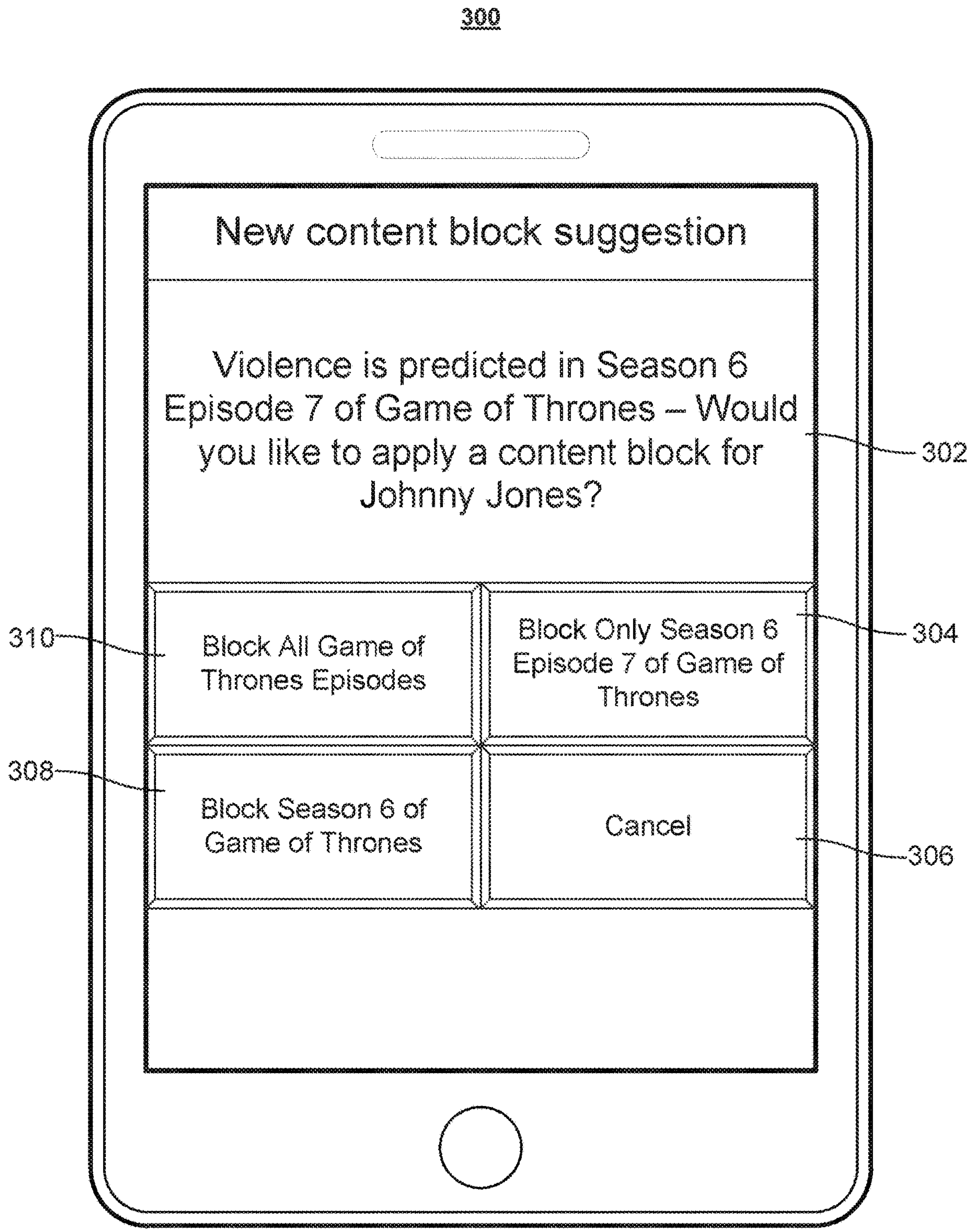
FIG. 3 shows an illustrative example of a user interface allowing a user to apply a suggested content restriction in accordance with some embodiments of the disclosure.

FIG. 3 shows an illustrative embodiment of a user interface allowing a user to apply a suggested content restriction in accordance with some embodiments of the disclosure. For example, user equipment 300 is depicted having content block description 302, episode block suggestion 304, cancel content block suggestion 306, season block suggestion 308, and series block suggestion 310. For example, the media guidance application may generate for display content block description 302 in response to determining that a content block should be applied with respect to the second user as described above and below with respect to FIG. 8, FIG. 9, and FIG. 10.

The media guidance application may generate for display content block description 302 comprising a description as to why the media guidance application has determined to provide the block. In the illustrative example in FIG. 3, the media guidance application may generate for display the text “Violence is predicted in season 6 episode 7 of Game of Thrones” in response to determining that indication 106 (“Wow, was closing my eyes throughout tonight’s episode of Game of Thrones!”) matches previous indications associated with media having violence (e.g., first previous indication 208 and second previous indication 218). The media guidance application may perform a search using the words in the indication to identify a media asset to which the indication is directed. For example, the media guidance application may perform a search using the words “tonight’s episode of Game of Thrones” to determine that the episode referred to in the indication is seasons 6 episode 7 of “Game of Thrones”.

In some embodiments, the media guidance application may determine to apply a content block with respect to a second user based on a profile of the second user. For example, the media guidance application may determine that the second user is prohibited from accessing content having violence. Accordingly, the media guidance application may suggest blocking access to season 6 episode 7 of “Game of Thrones” in response to determining that the media contains violence as described above. In an example, the media guidance application may generate for display content block description 302 prompting the user as to whether he or she would like to apply the content restriction.

In some embodiments, the media guidance application may generate a plurality of content block suggestions based on an attribute of the media. For example, the media guidance application may determine, based on metadata associated with the media, that “tonight’s episode of Game of Thrones” is associated with other media, such as other episodes in a part of a television series. In response to determining that the media is an episode in a part of a series, the media guidance application may generate for display an option to block just a specific episode referred to in the indication (e.g., episode block suggestion 304), block all episodes in a season of the series (e.g., season block suggestion 308), and block all episodes in a series (e.g., series block suggestion 310). A person of ordinary skill in the art would recognize that these are just exemplary content block suggestions and that the media guidance application may identify a number of different media assets to block based on the in the indication (e.g., indication 106). Systems and methods for identifying and suggesting a content blocks and restrictions are described below in detail in relation to FIG. 8, FIG. 9, and FIG. 10.

Figure 4:
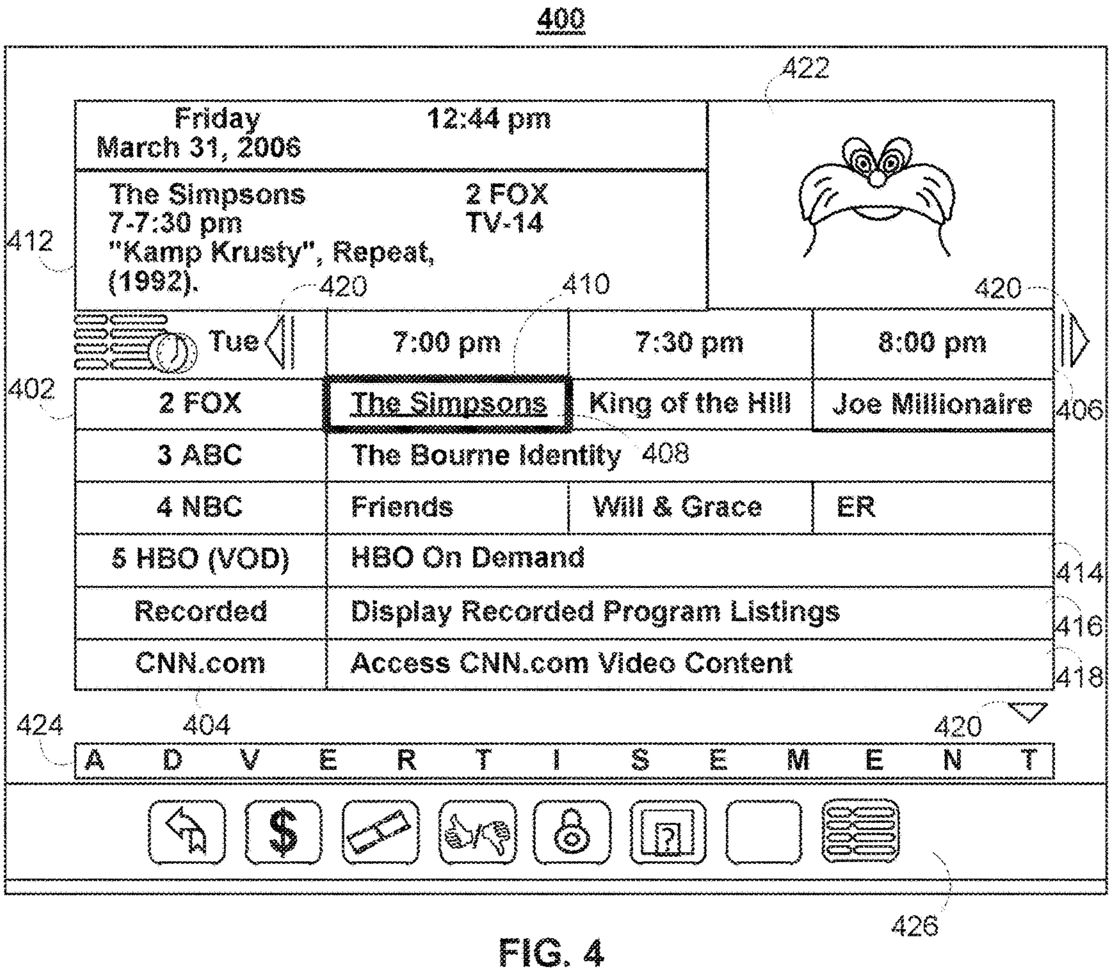
FIG. 4 shows an illustrative example of a media guidance display that may be presented in accordance with some embodiments of the disclosure.
Figure 5:
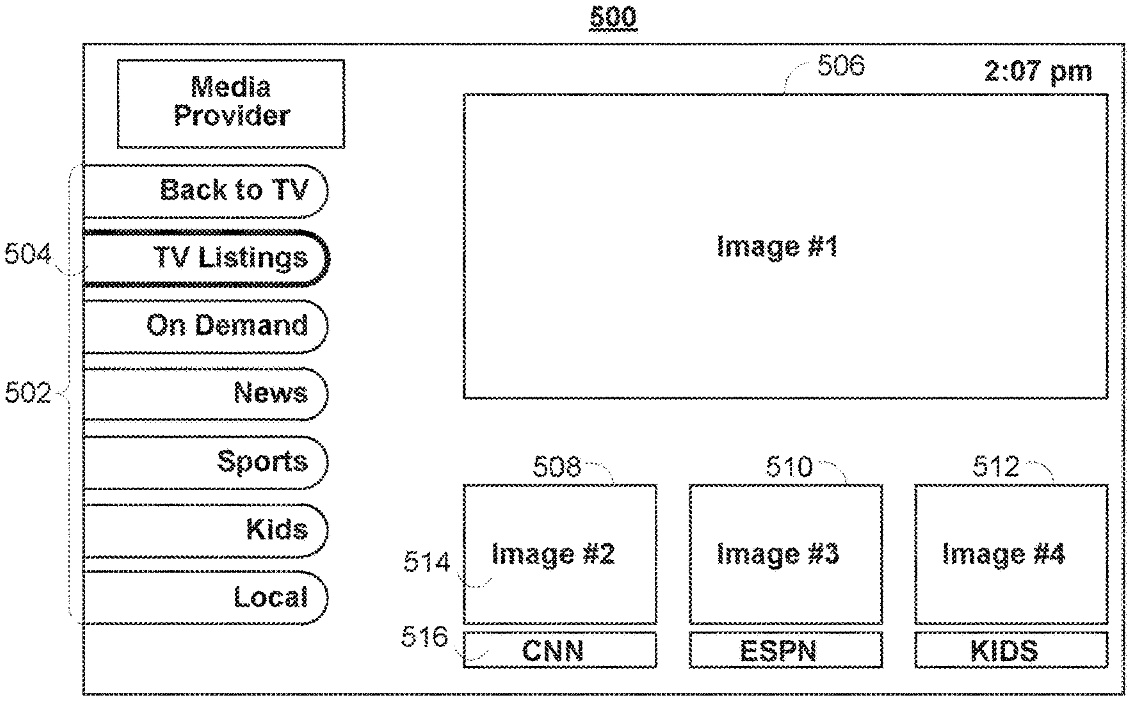
FIG. 5 shows another illustrative example of a media guidance display that may be presented in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
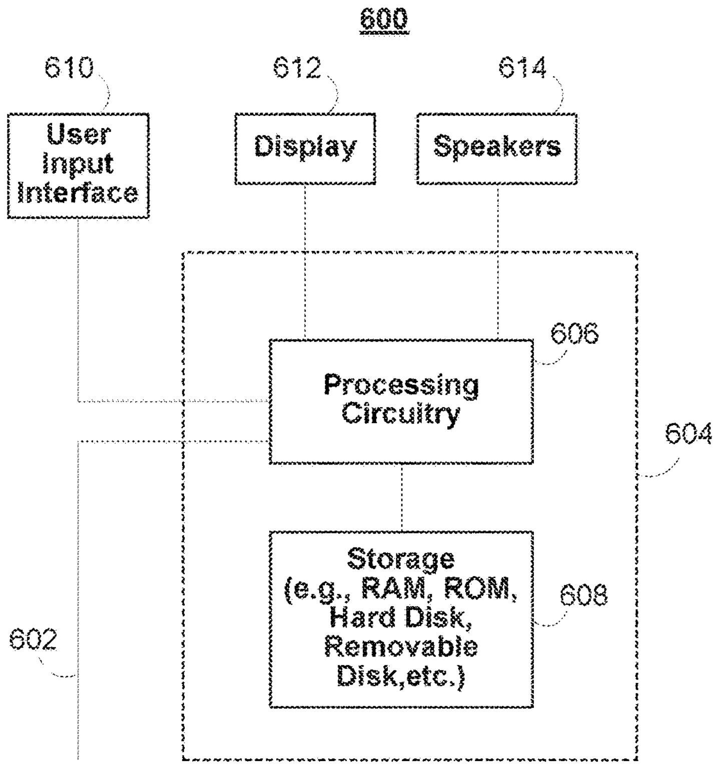
FIG. 6 is a block diagram of an illustrative user equipment device in accordance with some embodiments of the disclosure.
Figure 7:
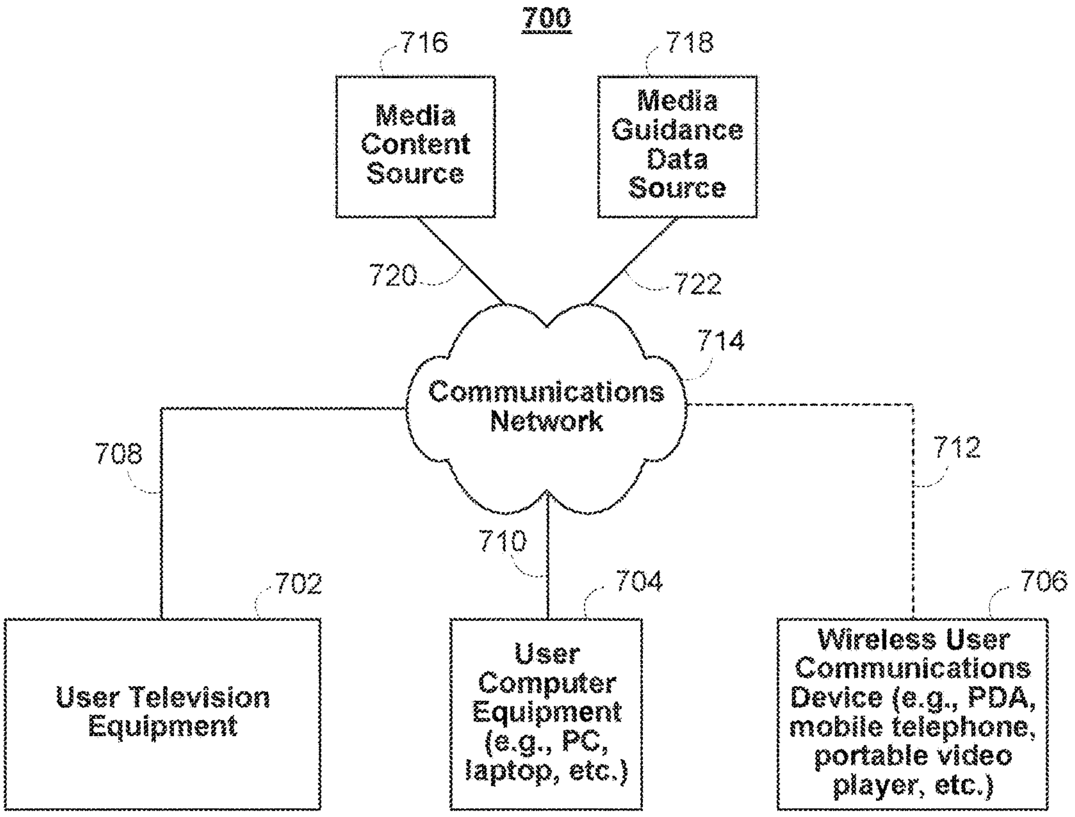
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
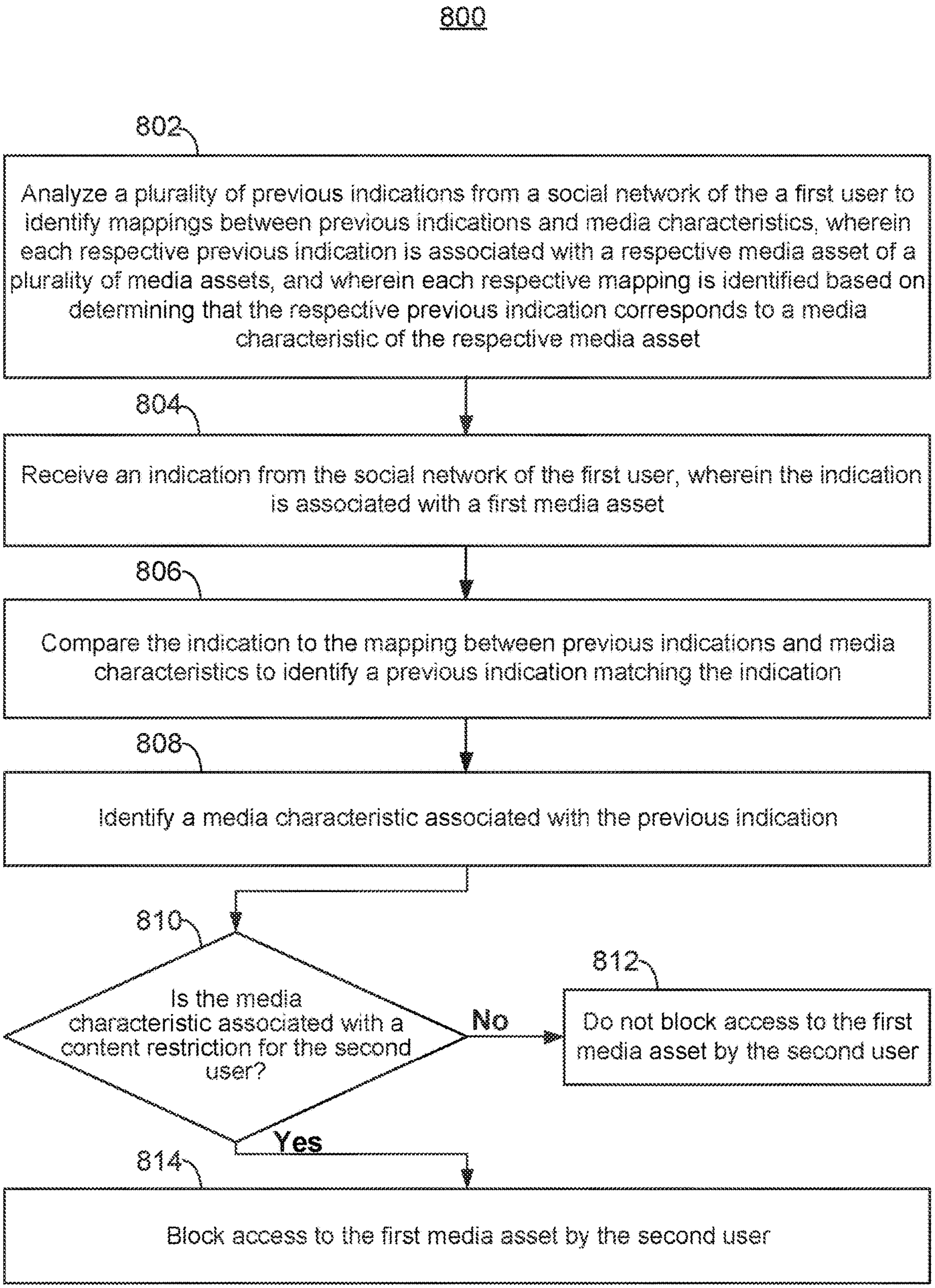
FIG. 8 is a flowchart of illustrative steps for suggesting content restriction based on a mapping between previous indications in a social network of a user in accordance with some embodiments of the disclosure.

FIG. 8 is a flowchart of illustrative steps for suggesting content restriction based on a mapping between previous indications in a social network of a user in accordance with some embodiments of the disclosure. For example, a media guidance application implementing process 800 may be executed by control circuitry 604. In some embodiments, instructions for executing process 800 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 1, 3, and 6-7.

Process 800 begins at step 802, where the media guidance application analyzes a plurality of previous indications from a social network of a first user to identify mappings between previous indications and media characteristics, wherein each respective previous indication is associated with a respective media asset of a plurality of media assets, and wherein each respective mapping is identified based on determining that the respective previous indication corresponds to a media characteristic of the respective media asset. For example, the media guidance application (e.g., via control circuitry 604) may retrieve posts from a social network of a first user and may analyze the posts to identify a correlation between what is said in the posts, media that is associated with the posts, and characteristics associated with the media (e.g., by performing a statistical analysis on the indications to identify words that co-occurs most frequently with various media characteristics). In response to identifying the correlation, control circuitry 604 may create a mapping between the previous indication and the respective media characteristic.

In some embodiments, control circuitry 604 may retrieve a user profile from memory. For example, control circuitry 604 may determine whether a user profile exists by first identifying the user (e.g., login information, a fingerprint for the user, a picture of the user (e.g., gained through a webcam), a hash value of data uniquely identifying the user or any other known identifying information of the user), and then by comparing the user's identity against entries of a user profile database. As a result of the comparison, control circuitry 604 may receive a pointer to a profile if one is located or may receive a NULL value if the profile does not exist. The user profile database may be located remote or local to control circuitry 604 (e.g., on storage 608 or on media guidance data source 718 accessed via communications network 714).

In some embodiments, control circuitry 604 may identify a first user profile corresponding to a social network of the first user. For example, control circuitry 604 may identify a Facebook profile for the first user (e.g., a user ID identifying a Facebook profile for the user stored on a remote server). Control circuitry 604 may utilize the profile of the first user to retrieve indications in the social network of the first user. For example, control circuitry 604 may use the Facebook profile of the first user to identify communications from other users that are visible to the first user (e.g., direct messages to the first user, or posts broadcasted from other users in the social network).

In some embodiments, control circuitry 604 may use an API or another interface to access profile data for the social network associated with the first user. For example, control circuitry 604 may determine that profile data associated with the social network of the first user is stored on a server corresponding to a provider of the social network (e.g., media guidance data source 718). For example, control circuitry 604 may determine that the Facebook profile for the user is stored on Facebook servers. Accordingly, control circuitry 604 may identify a function in an API corresponding to the provider of the social network and may utilize the function to retrieve information from the social network. For example, control circuitry 604 may access a table comprising a listing of functions that may be used by control circuitry 604 to query a Facebook server for the profile data. Control circuitry 604 may generate a packet for transmission over a network (e.g., communications network 714) based on instructions in the function. For example, control circuitry 604 may identify a function utilized to retrieve user data from the Facebook server. Control circuitry 604 may input parameters into the function corresponding to the first user (e.g., a Facebook user ID) to generate a packet to the Facebook server. In response to transmitting the packet, control circuitry 604 may receive data pertaining to the social network of the first user. For example, control circuitry 604 may retrieve, from the Facebook servers, data identifying indications (e.g., status updates from users in the first user's social network) in the social network of the first user.

In some embodiments, control circuitry 604 may identify user profile data comprising social network information associated with the user (e.g., text messages, a Facebook news feed, etc.), control circuitry 604 may retrieve database entries corresponding to indications that are accessible to the user. For example, control circuitry 604 may retrieve a user profile for a user's Twitter social media account. Control circuitry 604 may access information associated with the user's Twitter profile to retrieve Tweets (e.g., indications) that have been shared by other users in the first user's social network.

In some embodiments, control circuitry 604 may retrieve previous indications from a social network of a first user. For example, control circuitry 604 may retrieve data from the profile of the first user by, for example, using a function in an API as described above or by accessing indications stored in memory, such as storage 608. Control circuitry 604 may retrieve, from the profile, indications that are available to the first user. For example, control circuitry 604 may identify indications, such as social media posts that are accessible to the user (e.g., indications from other users that have been shared with the first user), such as a cat video shared by a cousin of the first user, or a movie review shared by a friend of the first user.

In some embodiments, control circuitry 604 may select the first indication and the second indication associated with a third user of a plurality of users. For example, control circuitry 604 may select each of the previous indications of the plurality of previous indications to be from a single user (e.g., the third user). For example, control circuitry 604 may determine that the first user (e.g., a parent or guardian) would like to receive content restriction suggestions for a second user (e.g., a child) based on detecting a setting in the user profile of the first user denoting a desire to receive content restriction suggestions. Control circuitry 604 may retrieve a second profile of the second user and may identify a closest match to a third profile of a third user in the social network of the first user. For example, control circuitry 604 may retrieve a profile for the child and may match the profile for the child to a profile of another child that is in the social network of the first user. Control circuitry 604 may identify the third user such that the third user is most similar to the second user. For example, control circuitry 604 may compute a metric of similarity based on the profile data. For example, control circuitry 604 may compare individual data fields in the second and the third profile and may increment the metric for each field that matches both profiles and may decrement the metric for each field that does not match both profiles. Control circuitry 604 may select, as the third profile, a profile from a plurality of profiles in the social network of the first user having highest metric. By limiting selection of previous indications to a single user that is similar to the second user, control circuitry 604 can more accurately create a mapping between previous indications and media characteristics that is representative of how the second user would also react to the various media. In another example, control circuitry 604 may identify the third user based on a setting in the profile of the first user. For example, control circuitry 604 may identify a setting in the profile of the first user denoting a popular movie critic for children's shows as the third user. For example, by limiting the selection of previous indications to the movie critic, control circuitry 604 may be able to more accurately identify respective language, or another respective indication (e.g., emoji, photo, etc.), used by the movie critic when describing media having a respective media characteristic (e.g., the movie critic may post a skull and crossbones emoji when describing movies he or she finds emotionally disturbing).

In some embodiments, control circuitry 604 may identify a plurality of previous indications that are associated with a media asset (e.g., first previous indication 208 or second previous indication 218). Control circuitry 604 may process each of the previous indications to only select indications that control circuitry 604 determines are associated with a media asset. For example, control circuitry 604 may analyze the plurality of previous indications to filter out previous indications that are irrelevant to media assets (e.g., an indication comprising wedding photos) from previous indications that are relevant to media assets (e.g., an indication comprising a movie review or indications related to live Tweets during a show broadcast). For example, control circuitry 604 may process a previous indication to identify tags, words, or other data that may identify a media asset. For example, control circuitry 604 compares words in a previous indication, such as first previous indication 208 to a database listing media assets. For example, control circuitry 604 may compare words in the previous indication to a title field in a database (e.g., a database stored on storage 608, media guidance data source 718, and/or media content source 716) listing a plurality of media assets. Control circuitry 604 may determine that the word "300" in first previous indication 208 matches a title field for a movie in the database. In response to determining that a word in the indication matches a movie in the database of media assets, control circuitry 604 may select the previous indication (e.g., first previous indication 208). Because control circuitry 604 determines that the previous indication (e.g., first previous indication 208) is associated with a media asset, control circuitry 604 may utilize the previous indication (e.g., first previous indication 208) in creating a mapping between words of the previous indication and media characteristics.

In some embodiments, control circuitry 604 may apply a natural language processing algorithm on the indication to determine whether an indication is directed to a media asset (e.g., to optimize performance of control circuitry 604 in determining whether an indication is directed to a media asset). For example, control circuitry 604 may apply a natural language processing algorithm, such as a name entity recognition algorithm, to identify words in the indication that map to proper nouns. Alternatively, control circuitry 604 may apply a part-of-speech algorithm to identify parts of speech for words in the indication. In an example, control circuitry 604 may identify nouns or proper nouns in the previous indication (e.g., first previous indication 208 and/or second previous indication 218). Control circuitry 604 may then search the database of media assets described above to determine if any of the words identified by control circuitry 604 as nouns or proper nouns match any media asset entries in the database. A person of ordinary skill in the art would recognize that this is merely an exemplary algorithm, any plurality of algorithms could be used to determine whether an indication is associated with a media asset.

In some embodiments, control circuitry 604 may receive a previous indication from a social network of the first user. For example, control circuitry 604 may retrieve first previous indication 208 or second previous indication 218 from a social network of the first user by, for example, accessing profile information for the first user stored remotely or locally to control circuitry 604 (e.g., media guidance data source 718 or storage 608). Control circuitry 604 may select first previous indication 208 and/or second previous indication 218 to perform an analysis on the content in the indication to identify mappings between previous indications and media characteristics. For example, control circuitry 604 may map a portion of the previous indication (e.g., first previous indication 208 and/or second previous indication 218) to a media characteristic based on a determination that a portion of the previous indication (e.g., first previous indication 208 and/or second previous indication 218) appears more frequently than a second portion of the previous indication (e.g., first previous indication 208 and/or second previous indication 218).

For example, control circuitry 604 may retrieve first previous indication 208 and may map the words "closing my eyes" to a media characteristic violence when control circuitry 604 determines the words "closing my eyes" occur most frequently with movies having violence with respect to other words in first previous indication 208. For example, control circuitry 604 may compare a phrase (e.g., "closing my eyes") in the selected previous indication (e.g., first previous indication 208) to other previous indications (e.g., other previous indications that are also associated with media as depicted in FIG. 2) to identify a second previous indication (e.g., second previous indication 218) having the same phrase (e.g., "closing my eyes"). Control circuitry 604 may identify a first plurality of media characteristics associated with a first media asset of the first previous indication and may identify a second plurality of media characteristics associated with a second media asset of the second previous indication. For example, control circuitry 604 may determine that first previous indication 208 is associated with a first movie "300" and second previous indication 218 is associated with a second movie "Saw VI". Control circuitry 604, may retrieve media characteristics associated with the first and the second media asset. For example, control circuitry 604 may retrieve media characteristics associated with "300" such as "action", "violence", "drama", "love", and "sex", and may retrieve media characteristics associated with "Saw VI" such as "violence", "horror", and "puppet". Control circuitry 604 may identify an intersection between the media characteristics and may therefore determine that there is a correlation between the matching indications and the media characteristics. For example, control circuitry 604 may identify a correlation between the words "closing my eyes" and the media characteristic "violence" because control circuitry 604 determines that both indications (e.g., first previous indication 208 and second previous indication 218) have the words "closing my eyes" and are also associated with media that is violent.

In some embodiments, control circuitry 604 may compute a first frequency that a first portion of the previous indication appears with respect to a media characteristic and a second portion that a second portion of the previous indication appears with respect to the media characteristic. Control circuitry 604 may divide the previous indication (e.g., first previous indication 208 and/or second previous indication 218) into portions. For example, control circuitry 604 may identify portions of the indication based on words, punctuation, or other characteristics of the indication. For example, control circuitry 604 may utilize a natural language processing algorithm to identify word phrases in the indication and may identify a portion as a phrase in the indication. For example, control circuitry 604 may tokenize words in the indication by matching words in the indication to known phrases (e.g., by comparing words to phrases in a database) or by identifying parts-of-speech in the indication and inferring phrase boundaries (e.g., based on subject-verb pairs).

In some embodiments, control circuitry 604 may compute the first frequency that a first portion of the previous indication appears with respect to the media characteristic by identifying the first portion, as described above, and identifying other previous indications where the first portion appears. For example, control circuitry 604 may determine that the word "closing my eyes" appears in ten previous indications (e.g., by matching the words "closing my eyes to previous indications of a plurality of previous indications), but the words "can't bear to watch" (e.g., a second portion) only appears in two previous indications. Therefore, control circuitry 604 may determine that the first frequency (e.g., frequency control circuitry 604 detects the first portion in the plurality of indications) is greater than the second frequency (e.g., frequency control circuitry 604 detects the second portion in the plurality of indications).

In some embodiments, control circuitry 604 may determine whether the first frequency is greater than the second frequency. In response to determining that the first frequency is greater than the second frequency, control circuitry 604 may identify a correlation between the first portion and a most prevalent media characteristic in the identified previous indications matching the first portion (e.g., the most prevalent media characteristic for the indications having the term "closing my eyes"). In response to identifying the correlation, control circuitry 604 may map the first portion to the most prevalent media characteristic (e.g., because control circuitry 604 determines that the first portion frequently appears with respect to media having the most prevalent media characteristic). In contrast, in response to determining that the first frequency is not greater than the second frequency, control circuitry 604 may map the second portion (e.g., "Can't bear to watch") to a most prevalent media characteristic in the identified previous indications matching the second portion (e.g., the most prevalent media characteristic for the indications having the term "can't bear to watch").

Control circuitry 604 may identify the most prevalent media characteristic in the identified previous indications based on identifying and enumerating media characteristics associated with each of the previous indications matching the portion. For example, control circuitry 604 may determine that the first frequency is greater than the second frequency and may therefore select the first portion (e.g., "closing my eyes") for the comparison. As described above, control circuitry 604 may identify a plurality of previous indications matching the first portion. For example, control circuitry 604 may employ fuzzy matching to match the term "closing my eyes" to other previous indications having the terms "closing my eyes", "covering my eyes", "hiding my face", etc. Based on the matching, control circuitry 604 may determine whether a first portion of the first previous indication (e.g., first previous indication 208) matches a second portion of a second previous indication (e.g., second previous indication 218). For example, control circuitry 604 may match the first portion "Closing my eyes" from first previous indication 208 ("Closing my eyes because I can't bear to watch the movie '300'") to a second portion (e.g., Closing my eyes") in second previous indication 218 ("Closing my eyes! I can't believe the amount of blood in 'Saw VI').

In some embodiments, one of the first portion and the second portion may be a hashtag, emoticon, web link, photo, or video. For example, control circuitry 604 may determine that a user frequently posts a humorous meme photo when viewing media having comedy. Accordingly, control circuitry 604 may match the humorous meme photo to other previous indications.

In some embodiments, control circuitry 604 may determine that the first and the second previous indication (e.g., first previous indication 208 and second previous indication 218) comprise words. In response to determining that the first and the second previous indications (e.g., first previous indication 208 and second previous indication 218) comprise words, control circuitry 604 may compare words in the first previous indication to words in the second previous indication to determine whether words associated with the first previous indication (e.g., first previous indication 208) match words of the second previous indication (e.g., second previous indication 218). For example, control circuitry 604 may determine that first previous indication 208 and second previous indication 218 are email messages comprising a written message. Control circuitry 604 may compare each word or phrase in first previous indication 208 to each word or phrase in second previous indication 218 and, using a fuzzy matching scheme, determine whether any words are in both the first and second indications (e.g., first previous indication 208 and second previous indication 218).

In some embodiments, control circuitry 604 may determine that the first portion matches the second portion based on determining that the words associated with the first previous indication match words associated with the second previous indication. For example, control circuitry 604 may determine that the words in the first indication matching the words in the second indication are the first portion. Likewise, control circuitry 604 may determine that the words in the second indication matching the words in the first indication are the second portion.

In some embodiments, in response to determining that the first portion matches the second portion, control circuitry 604 may identify a second media asset associated with the first previous indication, wherein the second media asset is associated with a first plurality of media characteristics, and a third media asset associated with the second previous indication, wherein the third media asset is associated with a second plurality of media characteristics. For example, control circuitry 604 may determine, as described above, that first previous indication 208 is associated with the movie “300”. For example, control circuitry 604 may apply a natural language processing algorithm on the words of first previous indication 208 to identify proper nouns in first previous indication 208. Using the natural language processing algorithm, control circuitry 604 may determine that “300” is a proper noun. For example, control circuitry 604 may compare words of first previous indication 208 (e.g., words identified as proper nouns) to a listing of media titles to identify the first media asset (e.g., a proper noun that matches a title from the listing of media titles).

In another example, control circuitry 604 may identify a second media asset associated with the second previous indication, such as second previous indication 218. For example, control circuitry 604 may identify a hashtag, or any other topic identifier, in the second indication (e.g., by identifying a character in the indication signifying the beginning of a tag, such as a ‘#’ character). Control circuitry 604 may compare an identified hashtag to a database of listing associations between has tags and media assets. For example, a database, such as a database stored at storage 608 or media guidance data source 718, may contain a first field with data identifying a media asset, and may contain a second field with hashtags associated with that media asset. When control circuitry 604 determines that the identified hashtag matches a hashtag in the database, control circuitry 604 may retrieve, from the database, data identifying the media asset associated with the matching hashtag. For example, control circuitry 604 may identify a hashtag “#GOT” and may match the hashtag “#GOT” to a database entry for the television show “Game of Thrones”. For example, control circuitry 604 may determine that users post the hashtag “#GOT” when describing the television show “Game of Thrones” and may, accordingly, retrieve the hashtag “#GOT” from a database entry associated with the television show “Game of Thrones”.

In some embodiments, control circuitry 604 may retrieve metadata associated with the second media asset associated with the first previous indication and the third media asset associated with the second previous indication. For example, control circuitry 604 may identify the second media asset (e.g., “300”) and third media asset (e.g., “Saw VI”) in first previous indication 208 and second previous indication 218, respectively, using the steps described above. Control circuitry 604 may access a database (e.g., database of media characteristics) comprising media characteristics associated with each media asset. For example, control circuitry 604 may transmit a query to a local database, such as a database stored on storage 608, or a remote database, such as a database stored on media guidance data source 718, comprising database entries having a first field with data identifying the media asset and a second field with data identifying a media characteristic. Control circuitry 604 may generate the query to comprise data uniquely identifying the second and/or the third media asset. For example, control circuitry 604 may generate a query comprising the words in the title of the media asset and may utilize the query to search the database for an entry matching the words of the title. In another example, control circuitry 604 may identify a unique number or string assigned to the media asset (e.g., control circuitry 604 may retrieve the unique number or string when identifying the media asset as described above). Control circuitry 604 may include the unique number or string when generating the query and may match the unique number or string to a database entry.

In an example, control circuitry 604 may retrieve a plurality of media characteristics, such as a genre, content rating, description, listing of actors or actresses, etc. from the database of media characteristics. For example, control circuitry 604 may retrieve a first plurality of media characteristics, such as “violence”, “2006” (the year the movie was released), “Zack Snyder” (the director), etc. corresponding to the second media asset associated with first previous indication 208 (e.g., “300”) based on matching the movie “300” to a database entry corresponding to the movie “300” and selecting the media characteristics associated with the database entry. Likewise, control circuitry 604 may identify a second plurality of media characteristics associated with the third media asset corresponding to second previous indication 218 (e.g., “Saw VI”) such as “violence”, “2009” (the year the movie was released), Kevin Greutert (the director) based no matching a unique identifier for the movie “Saw VI” (e.g., ‘tt1233227’ an IMDB unique identifier for the movie “Saw VI”) and selecting the media characteristics associated with the database entry matching the unique identifier.

In some embodiments, control circuitry 604 may determine whether a media characteristic matches a first media characteristic (e.g., first media characteristic 206) in the first plurality of media characteristics and a second media characteristic (e.g. second media characteristic 216) in the second plurality of media characteristics. For example, control circuitry 604 may compare each media characteristic in the first plurality of media characteristics with each media characteristic in the second plurality of media characteristics. For example, control circuitry 604 may compare each media characteristic in the first plurality and each media characteristic in the second plurality and may determine that the media characteristic “violence” is in both pluralities. Control circuitry 604 may identify a correlation between the media characteristic that is in both the first and the second pluralities (e.g., “violence”) and the portion of the indication (“e.g., closing my eyes”) based on a determination that both the first and the second previous indications have the terms “closing my eyes” and describe media assets having violence. In response to identifying the correlation, control circuitry 604 may map the media characteristic to the first and the second indication because, for example, control circuitry 604 may determine that because the first and the second previous indications (e.g., first previous indication 208 and second previous indication 218) each contained a same portion (e.g., “closing my eyes”) and because each corresponded to media having violence, that the media characteristic “violence” should be mapped to the indication “closing my eyes”. In a different example, control circuitry 604 may determine that a first previous indication 208 does not match a third previous indication (e.g., a third previous indication received by control circuitry 604 via a social network of the first user). For example, control circuitry 604 may determine that text in the second and third indications do not match (e.g., by comparing words in the first and the third previous indications and determining that no words match) and may accordingly not identify or map media characteristics associated with the first or third indication. In another example, when control circuitry 604 determines that text in the first previous indication matches text in the second indication, but that a media characteristic of the first previous indication does not match a media characteristic of the second previous indication, control circuitry 604 may not map the first and the third previous indication to a media characteristic.

Although the above examples are provided with respect to a first and a second previous indication, the methods and systems described above and below could be expanded to apply to any number of previous indications for identifying the correlation between media characteristics and indications. For example, control circuitry 604 may perform a statistical analysis on the previous indications from the social network of the first user to identify words that are most frequently used in social media posts associated with media assets. For each of the words identified by control circuitry 604, control circuitry 604 may perform any of the steps described above and below to determine a most prominent media characteristic for the media associated with indications comprising the respective word. For example, control circuitry 604 may determine that for indications with the phrase "Oh crap", the phrase appears most frequently for thriller movies. Control circuitry 604 may therefore determine that there is a correlation between the phrase "Oh crap" and thrillers, at least in the social network of the first user. Therefore, control circuitry 604 may map previous indications having the phrase "Oh crap" to the media characteristic "thriller". In some examples, control circuitry 604 may then infer that any new indications having phrase "Oh crap" relate to thrillers, even if the media asset in the new indication is not a thriller.

In some embodiments, control circuitry 604 may map the first previous indication (e.g., first previous indication 208) and the second previous indication (e.g., second previous indication 218) to the media characteristic in both the first and the second plurality of media characteristics. For example, control circuitry 604 may access a database stored locally or remotely to control circuitry 604 (e.g., storage 608 or media guidance data source 718) comprising a mapping between previous indications and media characteristics. Control circuitry 604 may add a new entry comprising the first previous indication (e.g., first previous indication 208) by adding to a first database field a portion of the first indication (e.g., a first database field comprising a portion of first previous indication 208 that matches second previous indication 218) and by adding to a second database field the media characteristic (e.g., a second database field comprising the media characteristic "violence" determined, by the control circuitry 604 to be associated with both first previous indication 208 and second previous indication 218). An exemplary depiction of a database table storing a mapping between previous indications and media characteristics is depicted in FIG. 2. A person of ordinary skill in the art would recognize that this is simply an exemplary structure for storing the mapping and any of a plurality of data structures may be utilized.

In an exemplary embodiment, control circuitry 604 may store the mapping in an associative array (e.g., a collection of key value pairs). For example, control circuitry 604 may identify a key for each pair in the array based on a determination that a first portion of a first indication matches a second portion of a second indication, and that both indications are associated with a same media characteristic, as described above. For example, control circuitry 604 may determine that the terms "closing my eyes" frequently appears in indications associated with violent media assets (e.g., control circuitry 604 enumerates a number of times the word "closing my eyes" appears in indications and determines that it appears at least a threshold percentage of the times with respect to violent media). Control circuitry 604 may select the portion of the indication as the key. For example, control circuitry 604 may select the text "closing my eyes" as the key (e.g., so that comparisons to text in new indications may be performed efficiently). Control circuitry 604 may select the media characteristic "violence" as the value for the key value pair. For example, control circuitry 604 may construct a key value pair for the associative array based on a hash value for the word "closing my eyes" as the key and "violence" as the stored value. Control circuitry 604 may determine whether a new indication matches any of the mapped previous indications by creating a hash value for words or other data in the new indication and determining whether it matches a hash value for a key in the mapping (e.g., the associative array).

The media guidance application may map the first previous indication and the second previous indication to the media characteristic because both the first and the second previous indications may be associated with the same media characteristic (e.g., because both indications are associated with media having the media characteristic). For example, control circuitry 604 may determine that there is a correlation between an indication and a media characteristic when a first and a second previous indication match and both correspond to different media having a same media characteristic as described above.

At step 804, control circuitry 604 receives an indication from a social network of the first user, wherein the indication is associated with a first media asset. For example, control circuitry 604 may retrieve a profile for the user (e.g., a user profile stored locally on storage 608 or remotely on media guidance data source 718 to control circuitry 604) comprising social network data, such as an indication in the social network of the user.

Control circuitry 604 may identify a media asset associated with the indication using any of the methods above for processing the indication and identifying a media asset corresponding to the indication. For example, control circuitry 604 may determine that the text "tonight's episode of Game of Thrones" in indication 106 corresponds to the first media asset based on the natural language processing described above. Control circuitry 604 may query a media database, such as a database stored on storage 608 or media guidance data source 718, to identify the first media asset. For example, control circuitry 604 may generate a query comprising the text "Game of Thrones" and "Tonight" (or in some embodiments, a date when the indication was posted). Control circuitry 604 may retrieve information from the database listing a unique identifier for the episode of "Game of Thrones" that is, or was playing, on the night that indication 106 was posted by Kip Smith.

In some embodiments, control circuitry 604 may identify the indication such that the indication is not already part of the mapping. For example, control circuitry 604 may determine that the indication has not been processed by control circuitry 604 and has not been placed into the mapping. For example, control circuitry 604 may maintain a timestamp for when the mapping was last updated, when a timestamp for the indication is earlier than a timestamp for when the mapping was last updated, control circuitry 604 may determine that the indication was not already part of the mapping. In another example, control circuitry 604 may maintain a list of all indications that are already part of the mapping (e.g., by storing text of the indication or hash value for the indication in a database entry). Control circuitry 604 may determine that the indication is not in the mapping when control circuitry 604 determines that the indication is not in the list of all indications that are already part of the mapping. For example, control circuitry 604 may retrieve an indication, such as indication 106 from a social network of Mary Jones because, for example, indication 106 is not already a part of the mapping depicted in exemplary table 200.

At step 806, control circuitry 604 compares the indication to the mapping between previous indications and media characteristics to identify a previous indication matching the indication. For example, control circuitry 604 may compare indication 106 to the indications stored in table 200. Control circuitry 604 may compare the indications by matching words or other data of indication 106 to words or other data in first previous indication 208, second previous indication 218, etc. For example, control circuitry 604 may compare the words in indication (e.g., indication 106) to words of indications stored in table 200 and may determine that the words in indication 106 match first previous indication portion 204 or second previous indication portion 214, because first previous indication 208, second previous indication 218 and indication 106 all comprise the text "Closing my eyes".

At step 810, control circuitry 604 identifies a media characteristic associated with the previous indication. For example, control circuitry 604 may retrieve one of first previous indication 208 or second previous indication 218 from table 200 and may access a database field storing a media characteristic associated with the entry. For example, control circuitry 604 may retrieve first media characteristic 206 from first entry 210 or may retrieve second media characteristic 216 from second entry 220 because both first entry 210 and second entry 220 are associated with previous indications that match indication 106.

In some embodiments, control circuitry 604 may infer a media characteristic corresponding to the first media asset based on the media characteristic identified at step 810. For example, control circuitry 604 may determine that the first media asset is associated with violence because indication 106 comprises words that match words typically utilized to describe media having violence by users in the first user's social network.

At step 810, control circuitry 604 determines whether the media characteristic is associated with a content restriction for a second user. For example, control circuitry 604 may retrieve a profile data corresponding to the second user. For example, control circuitry 604 may determine that the profile of the first user comprises content restrictions for the second user. Accordingly, control circuitry 604 may retrieve the content restriction from the profile of the first user. In another example, control circuitry 604 may determine that the profile of the first user does not comprise content restrictions for the second user. Accordingly, control circuitry 604 may retrieve a user profile for the second user from memory.

For example, control circuitry 604 may determine whether a user profile for the second user exists by first identifying the second user (e.g., a user ID for the second user stored in the profile of the first user, login information or any other known identifying information of the second user), and then by comparing the second user's identity against entries of a user profile database. As a result of the comparison, control circuitry 604 may receive a pointer to a profile for the second user if one is located or may receive a NULL value if the profile does not exist. The user profile database may be located remote or local to control circuitry 604 (e.g., on storage 608 or on media guidance data source 718 accessed via communications network 714). Control circuitry 604 may process the profile of the second user to identify a content restriction.

In an example, control circuitry 604 may access a database field for the profile of the second user comprising a listing of media characteristics that are restricted from viewing by the second user. For example, control circuitry 604 may retrieve a whitelist of media characteristics that are viewable by the second user. Accordingly, control circuitry 604 may determine that the user can view all media assets having characteristics that match media characteristics on the whitelist. In another example, control circuitry 604 may retrieve a blacklist of media characteristics that are restricted from viewing by the second user. Accordingly, control circuitry 604 may block access to any media assets having a media characteristic that is on the blacklist.

Control circuitry 604 may compare the media characteristic inferred by control circuitry 604 with the content restrictions for the second user and may proceed to step 812 when the media characteristic does not match a content restriction to allow for the user to access the first media asset (e.g., because control circuitry 604 determines that there is no restriction, by the second user, on viewing media having the media characteristic). Control circuitry 604 may proceed to step 814 when control circuitry 604 determines that the media characteristic is associated with a content restriction to block access to the first media asset by the second user.

In some embodiments, in response to determining that that the media characteristic matches a content restriction associated with the second user, control circuitry 604 may generate for display to the first user, a notification that control circuitry 604 has a suggested content restriction (e.g., a restriction on access to the first media asset), such as content restriction suggestion 108.

In some embodiments, control circuitry 604 detects a user selection of a content restriction suggestion (e.g., content restriction suggestion 108) and in response to receiving the user selection of content restriction suggestion 108, control circuitry 604 may generate for display the exemplary content block suggestion depicted in FIG. 3.

In some embodiments, control circuitry 604 may determine that the first media asset is a part of a sequence of additional media. For example, control circuitry 604 may determine that the first media asset is an episode of a series (e.g., by querying a media database, such as a database stored on storage 608 or media guidance data source 718 and retrieving data identifying the first media asset as an episode of a series). Accordingly, control circuitry 604 may generate for display options to block just the first media asset (e.g., episode block suggestion 304), all episodes in a season (e.g., season block suggestion 308), or all episodes in the series (e.g., series block suggestion 310). In response to user selection of an option to block multiple media assets (e.g., series block suggestion 310 or season block suggestion 308), control circuitry 604 may identify a second media asset associated with the first media asset. For example, in response to user selection of series block suggestion 310, control circuitry 604 may identify a second media asset that matches a series of the first media asset and may apply a content restriction to both the first and the second media asset. In another example, in response to selection of season block suggestion 308, control circuitry 604 may identify a second media asset that matches a season in a series of the first media asset. Accordingly, control circuitry 604 may apply a content restriction on both the first and the second media asset by the first user.

In some embodiments, control circuitry 604 may generate for display a description of the suggested content restriction. For example, control circuitry 604 may generate for display a notification describing the media characteristic that control circuitry 604 determines to correspond to the first media asset. For example, control circuitry 604 may generate for display content block description 302 describing the media characteristic and the first media asset identified in the indication. Control circuitry 604 may generate for display content block description 302 having a name of the second user when control circuitry 604 determines that the second user is restricted access to media having the media characteristic as described above.

At step 812, control circuitry 604 does not block access to the first media asset by the second user. For example, control circuitry 604 may determine that the first media asset (e.g., Tonight's Episode of Game of Thrones) likely corresponds to media having violence, however, control circuitry 604 determines that the second user can view violent media, therefore, control circuitry 604 may not suggest a content restriction.

At step 814, control circuitry 604 blocks access to the first media asset by the second user. For example, control circuitry 604 may determine that the first media asset has violence (e.g., the media characteristic) based on matching indication 106 to indications in mapping (e.g., first previous indication 208 and second previous indication 218 stored in table 200). Control circuitry 604 may retrieve a profile of a second user and may identify a content restriction for media having violence, as described above. Accordingly, control circuitry 604 may prevent the second user from accessing the first media asset. For example, control circuitry 604 may update the profile of the second user to add the first media asset to a blacklist of media assets that are restricted for access by the second user. In another example, control circuitry 604 may update data associated with the first media asset to comprise information on the media characteristic. For example, control circuitry 604 may update an entry for the first media asset in a media database (e.g., a database stored on storage 608 or media guidance data source 718) to include the media characteristic. Accordingly, when control circuitry 604 identifies an attempt by the second user to access the first media asset, control circuitry 604 will block access to the first media asset because control circuitry 604 will determine, based on the updated database entry associated with the first media asset, that the first media asset matches a media characteristic that is restricted for access by the second user.

In some embodiments, control circuitry 604 may block access to the first media access by the second user in response to a user selection to apply a content block suggestion. For example, control circuitry 604 may delay blocking access to the first media asset by the second user until control circuitry 604 detects input by the first user confirming the content restriction. For example, control circuitry 604 may block access to the first media asset in response to receiving selection of any one of episode block suggestion 304, cancel content block suggestion 306, season block suggestion 308, and series block suggestion 310.

In some embodiments, control circuitry 604 may update mappings between previous indication and media characteristics by mapping indication to the media characteristic. For example, in response to determining that the indication corresponds to the previous indication control circuitry 604 may also map the indication to the media characteristic of the previous indication (e.g., to strengthen the relationship between the mapping between the previous indication and the media characteristic). In some embodiments, control circuitry 604 may update the mappings in response to user feedback. For example, control circuitry 604 may generate for display an option to update the mapping when the first user agrees with the mapping (e.g., when the first user confirms that the first media asset is associated with the media characteristic). In some embodiments, when the user disagrees with the assessment by control circuitry 604 (e.g., when a user decides to cancel a suggested content restriction, such as content block description 302), control circuitry 604 may refrain from updating the mapping to include the indication because, for example, control circuitry 604 determines that the inference made by control circuitry 604 is incorrect.

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations, such as those at 810, may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction.

Furthermore, it should be noted that the process of FIG. 8 may be implemented on a combination of appropriately configured software and hardware, and that any of the devices or equipment discussed in relation to FIGS. 1, 3, and 6-7 could be used to implement one or more portions of the process.

Figure 9:
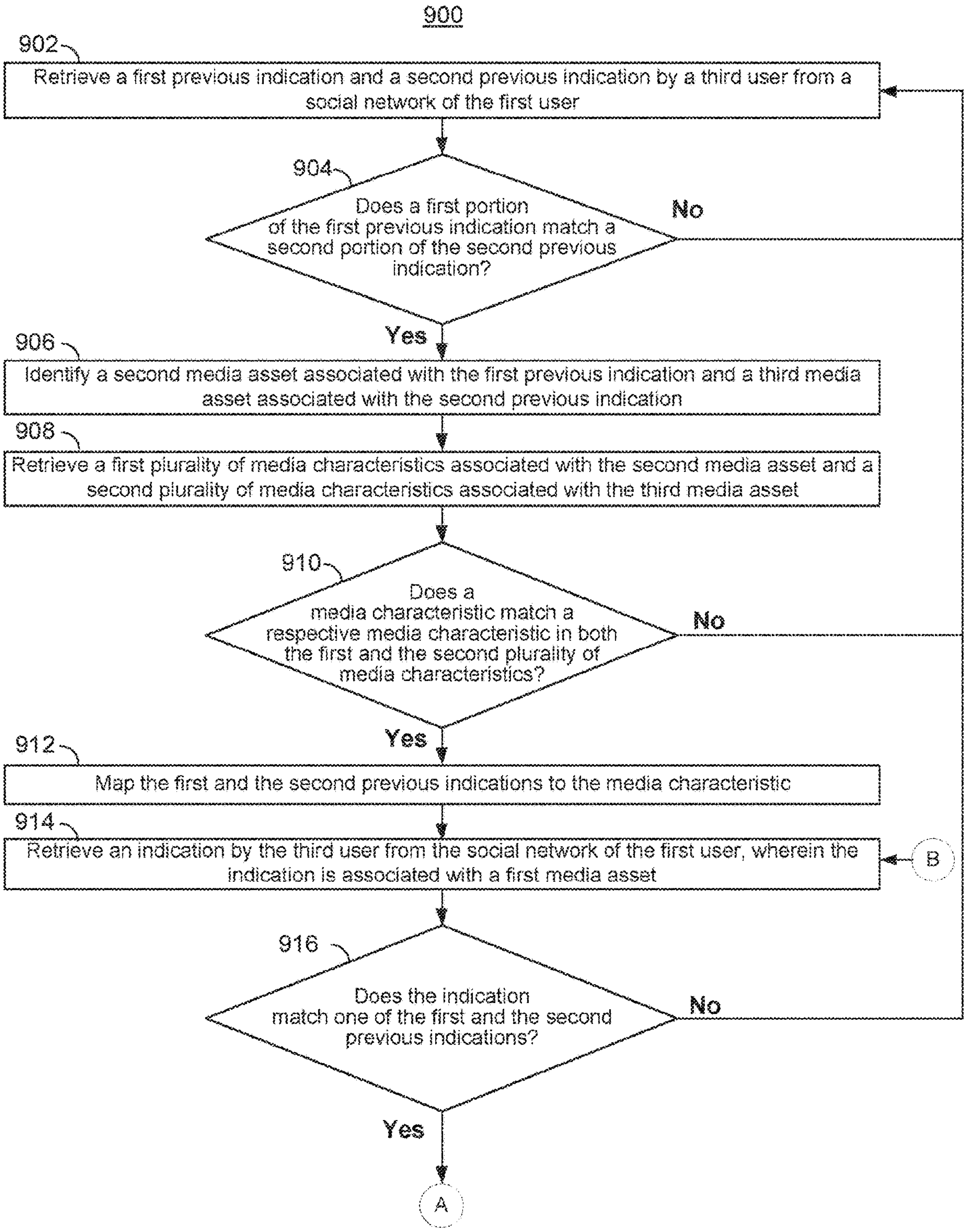
FIG. 9 is a flowchart of illustrative steps for updating mapping between previous indications and media characteristics in a social network of a user in accordance with some embodiments of the disclosure.

FIG. 9 is a flowchart of illustrative steps for mapping between previous indications and media characteristics in a social network of a user in accordance with some embodiments of the disclosure. For example, a media guidance application implementing process 900 may be executed by control circuitry 604. In some embodiments, instructions for executing process 900 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 900 or any step thereof could be performed on, or provided by, any of the devices shown in FIGS. 1, 2, and 6-7.

Process 900 begins at step 902, where control circuitry 604 retrieves a first previous indication and a second previous indication by a third user form a social network of the first user. For example, control circuitry 604 may identify a profile of a first user as described above. Control circuitry 604 may utilize the profile of the first user to retrieve information from a social network of the first user. For example, control circuitry 604 may retrieve a profile containing login credentials for a social network of the first user. Control circuitry 604 may generate a packet to a database located remotely to control circuitry 604, such as a database located at media guidance data source 718, comprising the login credentials and a request for a user indication. For example, control circuitry 604 may generate a packet to a Facebook (e.g., a social network) server comprising the first user's login credentials and a request for status updates or any other form of communication from a third user transmitted via the social network.

Control circuitry 604 may request a first indication and a second indication corresponding to a third user in the social network of the first user. For example, control circuitry 604 may transmit the request to the Facebook server described above twice to retrieve a first and a second indication. In another example, control circuitry 604 may designate a number of previous indications in the request (e.g., 20 most recent posts, or all posts since the end of last month).

At step 904, control circuitry 604 determines whether a first portion of the first previous indication matches a second portion of the second previous indication. For example, control circuitry 604 may retrieve first previous indication 208 and second previous indication 218 from a social network of the first user. Control circuitry 604 may compare words in the first previous indication to words in the second previous indication to determine whether the two previous indications match. For example, control circuitry 604 may determine that both first previous indication 208 and second previous indication 218 contain the words "closing my eyes" and therefore a first portion of the first previous indication matches a second portion of the second previous indication. When control circuitry 604 determines that a portion of the first previous indication matches a portion of the second previous indication, control circuitry 604 proceeds to step 906 to identify a media asset associated with the previous indications. When control circuitry 604 determines that a portion of the first previous indication does not match a portion of the second previous indication, control circuitry 604 proceeds back to step 904 to select another first and second previous indication for comparison.

At step 906, control circuitry 604 identifies a second media asset associated with the first previous indication and a third media asset associated with the second previous indication. For example, control circuitry 604 may analyze data in the first and the second previous indication to determine a media asset associated with each of the first and the second previous indications. For example, control circuitry 604 may identify a logo of a program in an image associated with the first previous indication. Accordingly, control circuitry 604 may determine that the first previous indication corresponds to the program in the logo. Control circuitry 604 may analyze words in the second previous indication and may determine, based on the analysis, that the second previous indication corresponds to a third media asset by matching words in the previous indication to a title of a third media asset.

At step 908, control circuitry 604 retrieves a first plurality of media characteristics associated with the second media asset and a second plurality of media characteristics associated with the third media asset. For example, control circuitry 604 may query a remote or local database for metadata or other information associated with the second and the third media asset. For example, control circuitry 604 may query media guidance data source 718 for information pertaining to the move "300" (e.g., the second media asset associated with first previous indication 208). In response to the query, control circuitry 604 may receive a plurality of media assets associated with the first previous indication. For example, control circuitry 604 may receive an array comprising a listing of metadata associated with the second media asset. Control circuitry 604 may utilize the plurality of media characteristics to determine whether to map the first previous indication and the second previous indication to a media characteristic of the plurality of media characteristics.

At step 910, control circuitry 604 determines whether the media characteristic matches a respective media characteristic in both the first and the second plurality of media characteristics. For example, control circuitry 604 may iteratively compare each media characteristic in the first plurality of media characteristics to each media characteristic in the second plurality of media characteristics to determine whether a media characteristic is in both pluralities. For example, control circuitry 604 may compare media characteristics associated with the movie "300" (e.g., the second media asset associated with first previous indication 208) and with the movie "Saw VI" (e.g., the first media asset associated with the second previous indication 218). If control circuitry 604 determines that a media characteristic (e.g., a characteristic indicating that either media contain violence) matches both pluralities, control circuitry 604 proceeds to step 912 to map the first and second previous indication to the media characteristic. Otherwise, control circuitry 604 proceeds to step 902 to retrieve a different first and/or second previous indication.

At step 912, control circuitry 604 maps the first previous indication and the second previous indication to the media characteristic. For example, control circuitry 604 may add an entry to a database storing mappings between media characteristics and indications. For example, control circuitry 604 may store, in the database, the portion of the first previous indication 208 matching the portion of the second previous indication 218 (e.g., "closing my eyes") in a first field of the database and may store the media characteristic "Violence" in a second field of the database.

At step 914, control circuitry 604 retrieves an indication by the third user from the social network of the first user, wherein the indication is associated with a first media asset. For example, control circuitry 604 may retrieve an indication from a social network of the first user, such as a new indication that has not yet been selected by control circuitry 604 for the mapping. For example, control circuitry 604 may identify a plurality of indications in the social network of the first user by querying a social media profile of the first user as described above. Control circuitry 604 may identify and select an indication from the third user. For example, control circuitry 604 may identify an indication from the third user by comparing a name field in a data structure corresponding to an indication with the name of the third user. For example, control circuitry 604 may retrieve an indication, such as indication 106 from user Kip Smith.

At step 916, control circuitry 604 determines whether the indication matches one of the first and the second previous indications. For example, control circuitry 604 may compare words of the indication to the mapping to determine whether the indication matches one of the first and the second previous indications. For example, control circuitry 604 may compare the words of indication 106 to the words of first previous indication 208 and second previous indication 218 to determine that the words "closing my eyes" matches the words in the previous indications. In response to determining that the indication matches one of the previous indications, control circuitry 604 proceeds to step 1002 in FIG. 10. Otherwise, control circuitry 604 proceeds to step 902 to retrieve a first and second previous indication from a social network of the first user.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations, such as those at 904, 910, and 916 may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 1, 3, and 6-7 could be used to implement one or more portions of the process.

In some embodiments, control circuitry 604 may retrieve, from the profile of the first user, rules defining when or how to apply content restrictions. For example, control circuitry 604 may retrieve from the profile of the first user, if this then that (IFTTT) rules and may apply content restrictions in accordance to the IFTTT rules. For example, control circuitry 604 may receive an IFTTT rule, such as a rule to only block access to restricted media assets by the second user when the first user is not nearby. For example, control circuitry 604 may receive a voice input from a microphone accessible to control circuitry 604, such as "Block access to restricted programs when I am not watching with my son." Accordingly, control circuitry 604 may identify the son of the speaker (e.g., using the profile information of the first user) and may establish a content restriction by the second user when the first user is not present. For example, control circuitry 604 may utilize a first location of a first mobile device associated with the first user and a second location of a second mobile device associated with the second user to make the determination on whether the users are close together (e.g., based on a comparison of the locations). When control circuitry 604 determines that the two locations are within a threshold value, control circuitry 604 may present a warning to the first user to notify the first user that the content restriction has been removed. When control circuitry 604 determines that the locations are not within a threshold value, control circuitry 604 may apply the content restriction.

Figure 10:
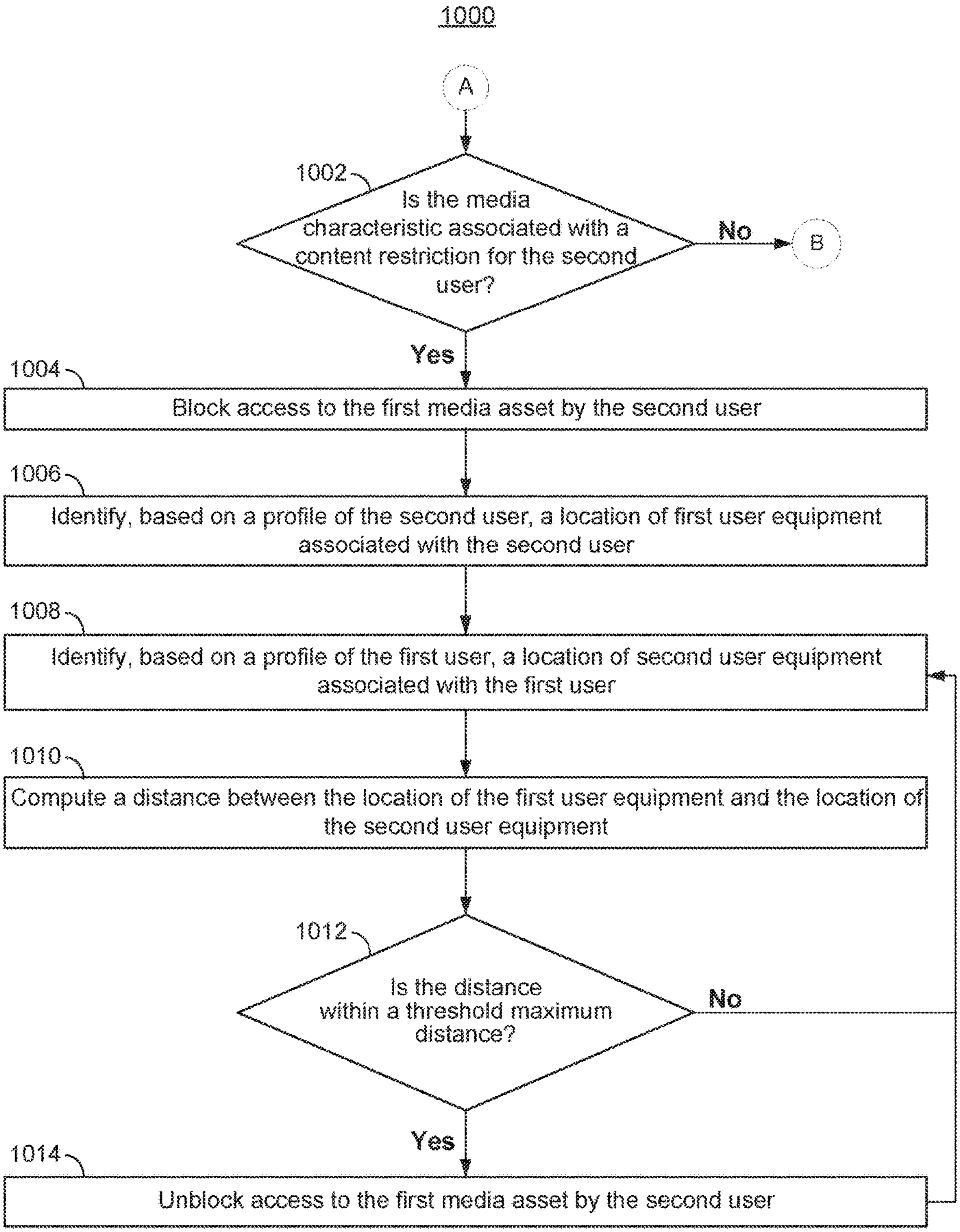
FIG. 10 is a flowchart of illustrative steps for blocking and unblocking access to media based on a location of user equipment devices, in accordance with some embodiments of the disclosure.

FIG. 10 is a flowchart of illustrative steps for blocking and unblocking access to media based on a location of user equipment devices, in accordance with some embodiments of the disclosure. For example, a media guidance application implementing process 1000 may be executed by control circuitry 604. In some embodiments, instructions for executing process 1000 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 1000 or any step thereof could be performed on, or provided by, any of the devices shown in FIGS. 1, 2, and 6-7.

At step 1002, control circuitry 604 determines whether the media characteristic is associated with a content restriction for the second user. For example, control circuitry 604 may retrieve a profile of the second user and may identify a content restriction field in the data structure for the profile for the second user. Control circuitry 604 may compare the content restriction with the media characteristic to determine whether a content restriction should be established for the media asset with respect to the second user. For example, control circuitry 604 may determine that the second user is restricted to only accessing media appropriate for children seven and under (e.g., based on a setting in the second user profile). Accordingly, control circuitry 604 may determine that the media characteristic (e.g., violence) is not appropriate for the second user because violence would not be appropriate for a child less than seven years of age. Accordingly, control circuitry 604 may determine to block access to the first media asset by the second user. When control circuitry 604 determines that the media characteristic is not associated with a content restriction, control circuitry 604 proceeds to step 914 (FIG. 9) and proceeds to retrieve another indication by the third user from a social network of the first user.

At step 1004, control circuitry 604 blocks access to the first media asset by the second user. For example, control circuitry 604 may prevent the second user from accessing the first media asset by, for example, requiring a parental control password or pin (e.g., a password or pin known by the first user but not the second user) to access the first media asset. For example, upon selection of the first media asset by, for example, a media guidance application, control circuitry 604 may generate for display a prompt indicating that the first media is blocked and requires a pin code to proceed.

At step 1006, control circuitry 604 identifies, based on a profile of the second user, a location of first user equipment associated with the second user. For example, control circuitry 604 may identify, based on a profile of a second user a user equipment device corresponding to the second user such as a cell phone, tablet, headgear or other device associated with the user (e.g., user television equipment 702, user computer equipment 704, or wireless user communications device 706). For example, control circuitry 604 may identify a network address (e.g., an IP address) of a portable device associated with the user, based on the profile information. For example, control circuitry 604 may transmit a network packet to the user equipment to retrieve GPS coordinates of the user equipment.

At step 1008, control circuitry 604 identifies, based on a profile of the first user, a location of second user equipment associated with the first user. For example, control circuitry 604 may access the profile of the first user to identify a second user equipment device corresponding to the first user. For example, control circuitry 604 may identify a MAC address corresponding to the second user equipment. Control circuitry 604 may transmit a network discovery packet over a local network connection (e.g., communications network 714) shared with a plurality of user equipment. Control circuitry 604 may aggregate a list of user equipment that responds to the discovery packet and may compare a MAC address of the second user equipment with MAC addresses in the list. In response to determining that a MAC address for the second user equipment is in the list, control circuitry 604 may determine that the second user equipment is near a location of control circuitry 604 (e.g., because of a limited range of the local network).

At step 1010, control circuitry 604 computes a distance between the location of the first user equipment and the location of the second user equipment. For example, control circuitry 604 may compare coordinates of the first user equipment and coordinates of the second user equipment to determine an absolute distance between the first and the second user equipment. In another example, control circuitry 604 may compute an approximate distance between the first and the second user equipment. For example, control circuitry 604 may determine whether a first user equipment is on a same local area network as a second user equipment (e.g., by pinging for the first and the second user equipment on the local area network). In response to determining that one of the first and the second user equipment are not on the local area network, control circuitry 604 may determine that the distance between the two devices is large. For example, control circuitry 604 may determine whether both of the first and the second user equipment respond to the ping and determine that the distance between the devices is large when there is no reply by one of the two devices. In contrast, when both devices reply to the ping, control circuitry 604 may determine that the distance is small because the range of the local area network is small.

At step 1012, control circuitry 604 determines whether the distance is within a threshold maximum distance. For example, control circuitry 604 may retrieve a threshold maximum distance from the profile of the first user. For example, control circuitry 604 may identify a setting enabling access to the first media asset by the second user when the first user is close to the second user. In some embodiments, control circuitry 604 may identify a level of precision associated with the threshold distance. For example, control circuitry 604 may determine a level of precision based on the distance threshold. For example, when the threshold distance is small (e.g., less than 10 feet) the distance precision should be less than the threshold distance (e.g., plus or minus 5 feet), when the threshold is large (e.g., about 100 feet) the distance precision could be larger, but still less than the threshold (e.g., plus or minus 30 feet). In some embodiments, control circuitry 604 may determine a method to compute the distance based on a desired precision. For example, control circuitry 604 may select a more precise method to compute the distance when the threshold is small than when the threshold is larger.

In an example, when control circuitry 604 determines that greater precision is necessary, control circuitry 604 may determine whether the first user equipment within the threshold distance of the second user equipment based on a wireless signal strength between the user equipment. For example, the media guidance application may determine a relative received signal strength (RSSI) of a wireless signal between the first user equipment and the second user equipment. The media guidance application may determine, based on the RSSI, an estimated distance between the first user equipment and the second user equipment. In another example, the media guidance application may measure received RF power over a shared wireless signal to estimate a location of the user.

In an example when control circuitry 604 determines that greater precision is not necessary, control circuitry 604 may utilize GPS coordinates of the first and the second user equipment (e.g., because GPS is inaccurate for under certain circumstances, such as indoors or in large cities). For example, control circuitry 604 may determine that the threshold maximum distance is large (e.g., greater than the margin of error of the GPS signal) and may therefore query each of the first and the second user equipment for a respective location.

In some embodiments, when control circuitry 604 determines that the distance is within a threshold maximum distance, control circuitry 604 may unblock access to the first media asset at step 1014. Otherwise, control circuitry 604 may proceed to determine a location of the first and second user equipment and return to step 1008.

At step 1014, control circuitry 604 unblocks access to the first media asset by the second user. For example, control circuitry 604 may unblock access to the first media asset by the second user in response to determining that the two devices are within a threshold distance. For example, control circuitry 604 may generate for display a prompt on the user equipment associated with the first user whether to unblock access to the first media asset when control circuitry 604 determines that the user equipment of the first user is within a threshold distance of the user equipment of the second user. In response to receiving confirmation to unblock access, control circuitry 604 may unblock access to the first media asset by the second user.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations, such as those at 1002 and 1012, may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 1, 3, and 6-7 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, at a first user equipment device, a request to consume a media asset, the request associated with a first user;

identifying, at the first user equipment device, a media characteristic associated with the media asset;

accessing, at the first user equipment device, a data structure associated with the first user, the data structure comprising a plurality of content restriction indications, each content restriction indication being associated with a respective media characteristic; and based on determining that the media characteristic is associated with a content restriction indication of the plurality of content restriction indications:

determining, at the first user equipment device, a distance between the first user equipment device and a second user equipment device associated with a second user; and based on determining that the distance exceeds a threshold, blocking, at the first user equipment device, access to the media asset by the first user.

2. The method of claim 1, wherein the distance between the first user equipment device and the second user equipment device is determined at a first time, the method further comprising:

determining, at a second time later than the first time, a second distance between the first user equipment device and the second user equipment device; and based on determining that the second distance does not exceed the threshold, allowing access to the media asset by the first user.

3. The method of claim 1, further comprising:

based on determining that the distance exceeds the threshold, generating instructions for display at the second user equipment device, a notification associated with the request to consume the media asset.

4. The method of claim 3, further comprising:

based on receiving user input at the second user equipment device, refraining from blocking access to the media asset, and allowing access to the media asset by the first user.

5. The method of claim 1, further comprising:

based on determining that the distance exceeds the threshold, generating instructions for display at the first user equipment device, a notification associated with the request to consume the media asset; and based on receiving user input from the second user at the first user equipment device, refraining from blocking access to the media asset, and allowing access to the media asset by the first user.

6. The method of claim 5, wherein the user input from the second user is a parental control password or a pin.

7. The method of claim 1, wherein determining the distance between the first user equipment device and the second user equipment device comprises:

identifying, based on a first user profile associated with the first user, a location of the first user equipment device;

identifying, based on a second user profile associated with the second user, a location of the second user equipment device; and computing the distance between the location of the first user equipment device and the location of the second user equipment device.

8. The method of claim 7, wherein the second user profile associated with the second user comprises the data structure associated with the first user.

9. The method of claim 1, further comprising:

receiving, at the second user equipment device, selections of one or more content restriction indications; and based on receiving the selections, adding the selected one or more content restriction indications to the data structure associated with the first user.

10. A system comprising:

a first user equipment device, the first user equipment device comprising control circuitry configured to:

receive a request to consume a media asset, the request associated with a first user;

identify a media characteristic associated with the media asset;

access a data structure associated with the first user, the data structure comprising a plurality of content restriction indications, each content restriction indication being associated with a respective media characteristic; and based on determining that the media characteristic is associated with a content restriction indication of the plurality of content restriction indications:

determine a distance between the first user equipment device and a second user equipment device associated with a second user; and based on determining that the distance exceeds a threshold, block access to the media asset by the first user.

11. The system of claim 10, wherein the distance between the first user equipment device and the second user equipment device is determined at a first time, and wherein the control circuitry is further configured to:

determine, at a second time later than the first time, a second distance between the first user equipment device and the second user equipment device; and based on determining that the second distance does not exceed the threshold, allow access to the media asset by the first user.

12. The system of claim 10, wherein the control circuitry is further configured to:

based on determining that the distance exceeds the threshold, generate instructions for display at the second user equipment device, a notification associated with the request to consume the media asset.

13. The system of claim 12, wherein the control circuitry is further configured to:

based on receiving user input at the second user equipment device, refrain from blocking access to the media asset, and allow access to the media asset by the first user.

14. The system of claim 10, wherein the control circuitry is further configured to:

based on determining that the distance exceeds the threshold, generate instructions for display at the first user equipment device, a notification associated with the request to consume the media asset; and based on receiving user input from the second user at the first user equipment device, refrain from blocking access to the media asset, and allow access to the media asset by the first user.

15. The system of claim 14, wherein the user input from the second user is a parental control password or a pin.

16. The system of claim 10, wherein the control circuitry is further configured, when determining the distance between the first user equipment device and the second user equipment device, to:

identify, based on a first user profile associated with the first user, a location of the first user equipment device;

identify, based on a second user profile associated with the second user, a location of the second user equipment device; and compute the distance between the location of the first user equipment device and the location of the second user equipment device.

17. The system of claim 16, wherein the second user profile associated with the second user comprises the data structure associated with the first user.

18. The system of claim 10, wherein the control circuitry is further configured to:

receive, at the second user equipment device, selections of one or more content restriction indications; and based on receiving the selections, add the selected one or more content restriction indications to the data structure associated with the first user.

19. A method comprising:

receiving, at a first user equipment device, a request to consume a media asset, the request associated with a first user;

based at least in part on receiving the request, retrieving, from a social network, at least one social media post related to the media asset;

identifying one or more media indications associated with the at least one social media post;

mapping the one or more media indications to one or more media characteristics;

generating for display, at a second user equipment device associated with a second user, a recommended content restriction for the first user based at least in part on the mapped media indications and the media characteristics;

determining a distance between the first user equipment device and the second user equipment device associated with the second user; and based on determining that the distance exceeds a threshold and based on the recommended content restriction, blocking access to the media asset by the first user.

20. The method of claim 19, wherein the media asset is an image, an audio clip, or a video clip.

* * * * *